United States Patent [19]
Van Linder et al.

[11] 3,799,322
[45] Mar. 26, 1974

[54] GRID FEEDER

[75] Inventors: Ronald C. Van Linder, Watervliet; Basil R. Van Linder, Kalamazoo, both of Mich.

[73] Assignee: Kalamazoo Manufacturing Company, Kalamazoo, Mich.

[22] Filed: May 22, 1972

[21] Appl. No.: 255,755

Related U.S. Application Data

[63] Continuation-in-part of Ser. No. 125,622, March 18, 1971.

[52] U.S. Cl. .............. 198/35, 198/33 AD, 214/8 H, 214/8 SS
[51] Int. Cl. ..................... B65g 59/00, G65g 47/24
[58] Field of Search.......... 198/33 AD, 35; 271/119, 271/121, 126, 150; 214/8.5 R, 8.5 A, 8.5 H, 8.5 SS

[56] References Cited
UNITED STATES PATENTS
2,611,470  9/1952  Rudolph ............................. 198/35
3,057,453  10/1962 McAlpine ..................... 198/33 AD Primary Examiner—Edward A. Sroka
Attorney, Agent, or Firm—Woodhams, Blanchard and Flynn

[57] ABSTRACT

A grid feeder device for storage battery grids or plates comprises a pivotally oscillating bellcrank-like member and associated grid stop means and grid guiding means which, with pickup disks, are interposed between input and output conveyors. The input conveyor consists of a pair of continuously orbiting endless flexible conveying elements or chains upon which a plurality of grids are supported in substantially vertical orientation, the continuous movement of the conveying elements tending to maintain such grids closely packed together and for urging the leading or forward several of the grids onto a support edge of the oscillating member when the latter is in its lower and rearwardmost position and against an abutment thereon. The support edge of the oscillating member periodically moves forwardly and upwardly carrying the several grids therewith and moving the forwardmost one of the grids into the path of a tooth on the rotating pickup disk, which rotates in synchronism with the oscillating member. The grid stop means limit the forward movement of the forwardmost grid so that only that grid is picked up by the tooth on the rotating pickup disk. As the forwardmost grid is lifted from the support edge of the oscillating member by the rotating pickup disk, the grid guiding means urges same firmly against the surface of the pickup disk above the tooth thereon and the support edge of the oscillating member returns downwardly and rearwardly to its original position for receiving an additional grid or grids from the input conveyor to repeat the above mentioned cycle of operation. In the meantime, the rotating disk transfers the aforementioned forwardmost grid to the output conveyor, the speed of the output conveyor being adjusted with respect to the speed of the rotating disk and oscillating member so that grids will be placed on the output conveyor in a horizontal and close spaced condition to allow further operations to be carried out thereon, such as a grid pasting operation.

27 Claims, 22 Drawing Figures

PATENTED MAR 26 1974 3,799,322
SHEET 1 OF 6

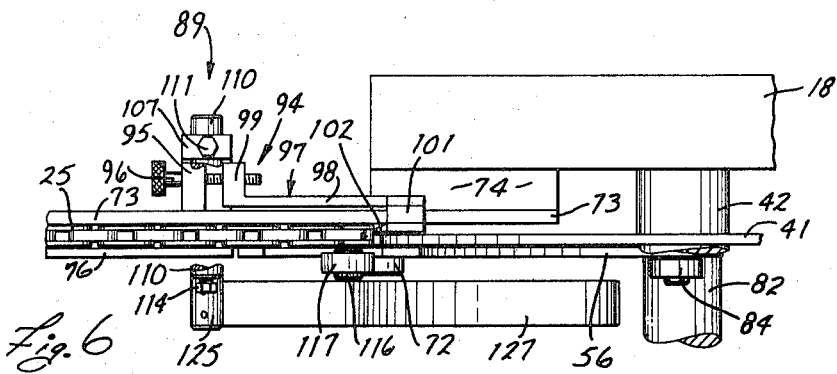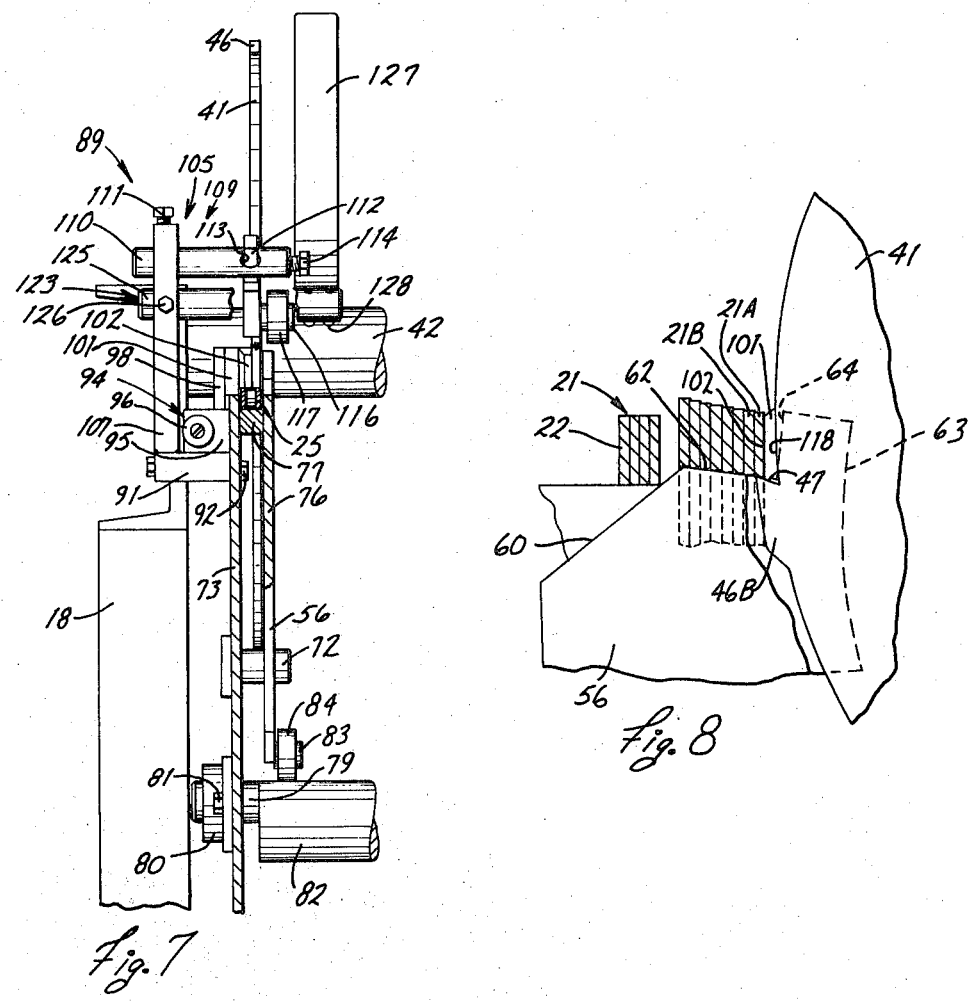

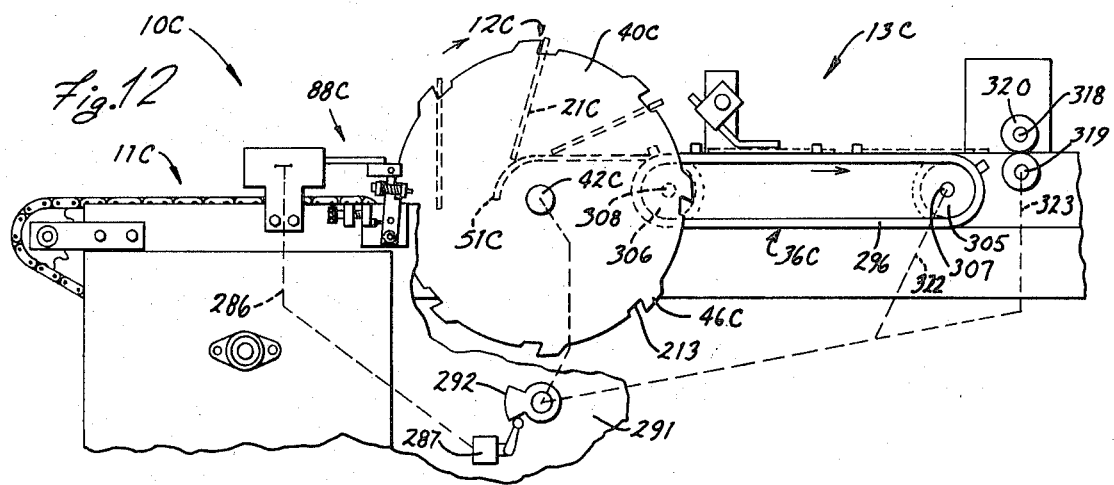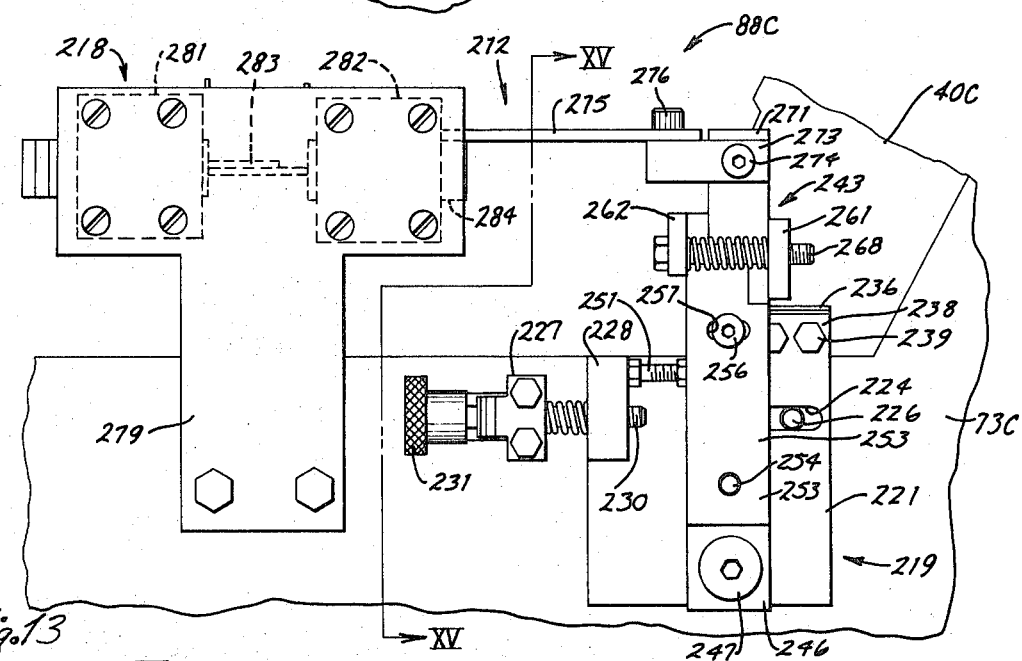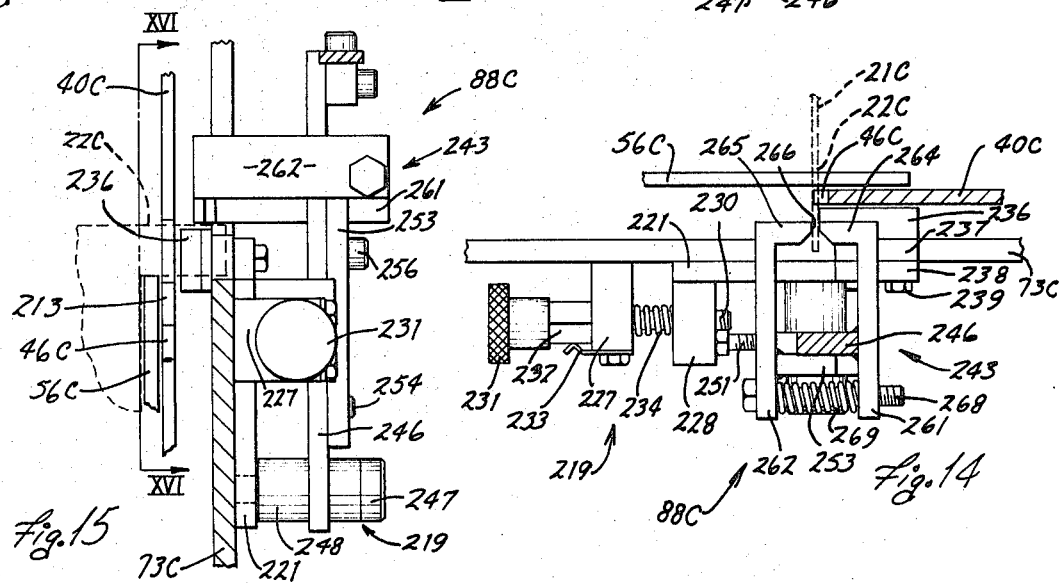

GRID FEEDER

CROSS REFERENCE TO RELATED APPLICATION

This application is a continuation-in-part of copending application Ser. No. 125,622 filed Mar. 18, 1971 and entitled GRID FEEDER.

FIELD OF THE INVENTION

This invention relates to a grid feeder and more particularly relates to a grid feeder device having an oscillating member interposed between an input conveyor and a pick up disk.

BACKGROUND OF THE INVENTION

The present invention arose as a solution to a vexing problem in the handling of grids for storage batteries and more particularly in the feeding thereof through a suitable processing machine such as a grid pasting machine, and therefore is discussed hereafter in terms thereof. However, it is contemplated that the present invention is applicable to mechanisms for feeding pasted grids or plates to brushes and slitters and so forth and is also applicable to feeding of other platelike articles, particularly those having sidewardly extending ears thereon. Conventionally, grids to be pasted are placed upon a horizontal conveyor belt which moves past a grid pasting station. Because it is necessary to a successful pasting operation that the full surface of one side of the grid be exposed to the pasting station, successive grids must not overlie each other in whole or in part. Also, little or no space must be left between the grids on the belt conveyor lest paste from the pasting station be applied to the face of the belt itself, since such would necessitate shutting down of the machine to clean the belt. Since the belt is normally run continuously at a fixed speed, grids must be placed thereon in a properly timed sequence to avoid either overlapping of grids or excessive spacing therebetween.

One prior method of so placing grids on the belt conveyor associated with a pasting machine has been to provide one or more rotatable coaxial pickup disks located adjacent the head of the belt conveyor and to provide an input conveyor consisting of a pair of spaced, continuously moving chains associated therewith in a manner that the chains continuously urge and pack a horizontal stack of vertical grids against the peripheries of the disks so that teeth on the disks pick up grids from the stack and place same upon the belt conveyor. However, it has been found that the pickup disks will not reliably pick up one and only one grid at a time from the stack. More particularly, if the teeth on the disks are made large enough to reliably pick up a grid they will often pick up more than one grid at a time which results in a complete or partial overlapping of grids on the pasting machine conveyor belt and thus an improper pasting of at least one of those grids. On the other hand if the teeth on the disks are made sufficiently small that they will reliably pick up no more than one grid from the stack, they will often fail to pick up any grid, which results in a relatively large open space on the belt between a pair of successive grids and thus results in an inadvertent application of paste to the belt. It is believed that the above mentioned difficulty in proper transfer of single grids from the input conveyor to the toothed disks may result from minor surface imperfections or roughness on the opposed faces of the grids which due to the continuous urging thereof together by the input chain conveyor sometimes causes two or more of the grids to stick together so that the toothed disks may pick up none or may pick up several of the grids rather than the desired one grid at a time.

In response to such problems there has been developed in accordance with the present invention a transfer structure hereinafter described in detail which assures a reliable transfer of one grid at a time from the input chain conveyor to the toothed pickup disk set and thus insures that grids will be placed upon the output belt conveyor in proper close spaced relationship and without overlapping.

Accordingly, the objects of this invention include provision of:

1. A grid feeder device which assures that articles such as grids for storage batteries will be placed one at a time in a continuous evenly timed sequence on an output member.

2. A grid feeder device, as aforesaid, which will place articles on a continuously moving output conveyor with a predetermined regular spacing and no overlapping.

3. A grid feeder device, as aforesaid, in which transfer means are provided capable of reliably transferring one and only one article at a time from a close spaced or compressed stack thereof to rotating toothed pickup disks.

4. A grid feeder device, as aforesaid, in which the transfer means will reliably transfer articles one at a time from a stack thereof to toothed pickup disks despite continuously applied urging of the articles in the stack together and toward the pickup disks and despite the tendency of such articles to stick together in groups of two or more.

5. A grid feeder device, as aforesaid, which is particularly adapted to feeding of battery grids to a grid pasting machine but which is also readily adaptable to handling of other articles of a more or less similar nature for feeding same to a desired location.

6. A grid feeder device, as aforesaid, in which the transfer means includes an oscillating member interposed between the input conveyor and toothed rotating disks which oscillates in synchronism with rotation of the disks and also includes guide means for assisting in assuring transfer of one and only one article at a time.

7. A grid feeder device, as aforesaid, which is adaptable to transferring articles reliably in fixed-size groups other than one and which, for example, may be adapted to transfer articles reliably two at a time, three at a time, etc., if desired.

8. A grid feeder device, as aforesaid, which is of simple and reliable construction, is capable of economical manufacture and of reliable service for long periods of time and which is readily serviceable.

Other objects and purposes of this invention will be apparent to persons acquainted with apparatus of this general type upon reading the following specification and inspecting the accompanying drawings.

BRIEF DESCRIPTION OF THE DRAWINGS

FIG. 6 is a fragmentary sectional view substantially taken along the line VI—VI of FIG. 5.

FIG. 7 is a fragmentary sectional view substantially taken along the line VII—VII of FIG. 5.

FIG. 8 is an enlarged fragment of FIG. 5 and showing a tooth on the toothed disk in a position intermediate that of FIGS. 4 and 5.

FIG. 12 is a partially broken, side elevational view of a further modified grid feeder device according to the present invention.

FIG. 13 is an enlarged fragmentary view of a portion of the apparatus of FIG. 12.

FIG. 14 is a fragmentary top elevational view of a portion of the apparatus of FIG. 13.

FIG. 15 is a sectional view substantially taken on the line XV—XV of FIG. 13.

Figure 1:
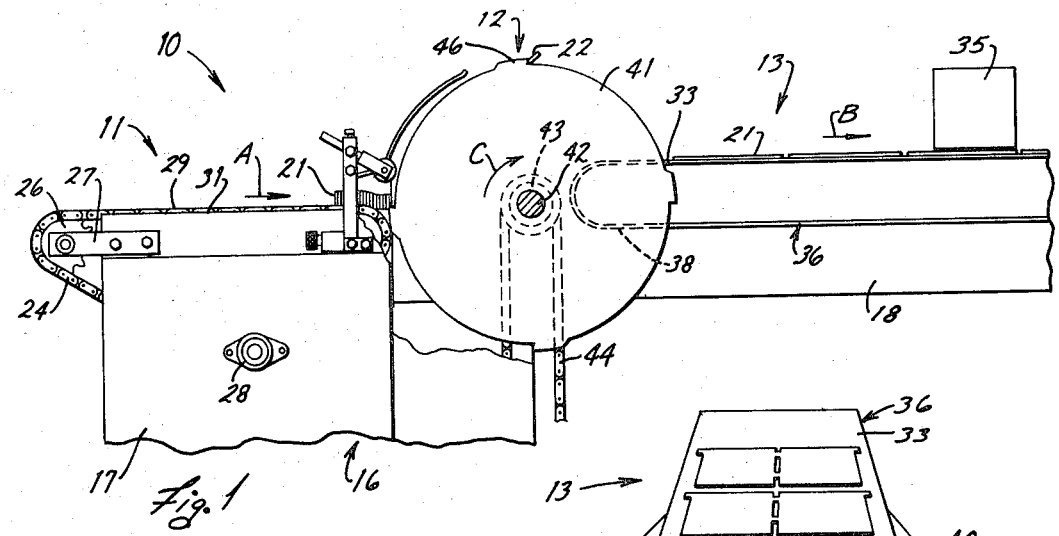
FIG. 1 is a partially broken side elevational view of the grid feeder device of the present invention.

Certain terminology will be used in the following description for convenience in reference only and will not be limiting. The words "up", "down", "right" and "left" will designate directions in the drawings to which reference is made. The words "forwardly" and "rearwardly" will refer to the direction of material flow through the device, forwardly being the normal flow direction. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a grid feeder device for storage battery grids or plates comprising a pivotally oscillating bellcrank-like member and associated grid stop means and grid guiding means which, with pickup disks, are interposed between input and output conveyors. The input conveyor consists of a pair of continuously orbiting endless flexible conveying elements or chains upon which a plurality of grids are supported in substantially vertical orientation, the continuous movement of the conveying elements tending to maintain such grids closely packed together and for urging the leading or forward several of the grids onto a support edge of the oscillating member when the latter is in its lower and rearwardmost position and against an abutment thereon. The support edge of the oscillating member periodically moves forwardly and upwardly carrying the several grids therewith and moving the forwardmost one of the grids into the path of a tooth on the rotating pickup disk, which rotates in synchronism with the oscillation of the oscillating member. The grid stop means limit the forward movement of the forwardmost grid so that only that grid is picked up by the tooth on the rotating pickup disk. As the forwardmost grid is lifted from the support edge of the oscillating member by the rotating pickup disk, the grid guiding means urges same firmly against the surface of the pickup disk above the tooth thereon and the support edge of the oscillating member returns downwardly and rearwardly to its original position for receiving an additional grid or grids from the input conveyor to repeat the above mentioned cycle of operation. In the meantime, the rotating disk transfers the aforementioned forwardmost grid to the output conveyor, the speed of the output conveyor being adjusted with respect to the speed of the rotating disk and oscillating member so that grids will be placed on the output conveyor in a horizontal and close spaced condition to allow further operations to be carried out thereon, such as a grid pasting operation.

DETAILED DESCRIPTION

Figure 2:
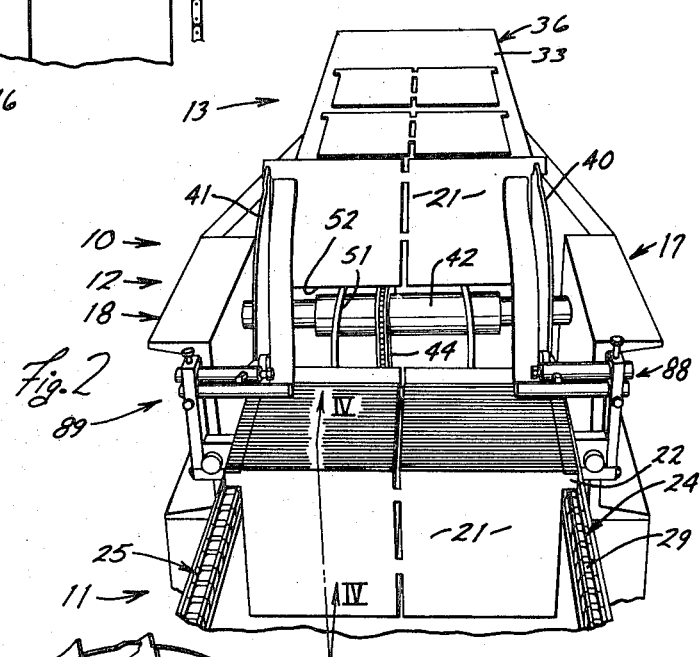
FIG. 2 is a pictorial view taken from the leftward end of the device of FIG. 1.

The device 10 (FIG. 1) embodying the invention may be considered to consist of three structurally and functionally interconnected sections, a leftward or input section 11, a central or transfer section 12 and a rightward or output section 13. The device 10 comprises a frame structure 16 comprising rightward and leftward sidewalls 17 and 18, respectively, as seen in FIG. 2.

The input section 11 is arranged for presenting a plurality of articles 21, which in the preferred embodiment of the invention are battery grids, in horizontally stacked relation to the transfer section 12. Although the present invention was developed in connection with such battery grids, it is contemplated that other generally similar articles may be handled by the device 10 either in the condition disclosed or with relatively minor modifications.

The battery grids 21 are conventional but will be briefly described for purposes of more clearly illustrating the invention. The grids 21 are substantially planar though same may have an intentional surface pattern (not shown) and/or any of a variety of types of surface imperfections or roughness tending to make same stick together when packed into a stacked relationship as shown in FIGS. 1 and 2. The device 10 of the present invention is capable of handling such grids despite any such surface roughness or the like resulting in a tendency of the stacked grids to stick together and, of course, will also be capable of handling smooth faced and nonadherent grids as well. The grids 21 are substantially rectangular in form and are provided adjacent the top edge thereof, as seen in FIG. 2, with rightward and leftwardly extending ears or lugs, one of which is indicated at 22.

The input section 11 comprises an endless conveyor which in the present embodiment inlcudes a pair of elongated endless flexible elements such as chains 24 and 25. The chains are each supported by a plurality, here three, of sprockets 26 mounted for rotation on the corresponding ones of the sidewalls 17 and 18 by any convenient means, shown for example at 27 and 28. The three sprockets 26 are located at respective apices of an imaginary triangle (not shown) so that the chains 24 and 25 passing thereover describe substantially triangular orbits. Thus, each of the chains has at a given instant an upper substantially horizontal reach 29 and a pair of lower reaches extending downwardly substantially toward the intermediate bearing support 28. The upper surface of the upper reach 29 extends slightly above the adjacent top edge 31 of the adjacent one of the frame structure sidewalls 17 and 18 for supporting the adjacent ears 22 of the grids 21 thereon, the remaining or intermediate portion of the grids depending loosely between the adjacent chains 24 and 25 and the adjacent portions of the frame structure sidewalls 17 and 18.

The chains 24 and 25 are rotatably driven with the upper reaches 29 thereof moving rightwardly as seen in FIG. 1 and thus forwardly in the direction of the arrow A. In the normal operation of the device 10, a horizontal stack of grids 21, which are held in a substantially vertical orientation (here by gravity) are placed between the chains 24 and 25 with the ears 22 thereof supported by such chains, the forward movement of the chains tending to move the grids 21 forwardly toward the transfer section 12 and to pack or compress same snugly together. The chains 24 and 25 are rotatably driven at a preselected fixed speed by any convenient and conventional means (not shown).

The output section 13 comprises an output conveyor surface 33 (FIGS. 1–3) which is axially aligned with the input section 11 and transfer section 12 and travels rightwardly or forwardly in the direction of the arrow B (FIG. 1) in a preferably substantially horizontal plane. Although the upper surface 33 and the upper reaches 29 of the chains 24 have been indicated to be substantially horizontal, it is fully contemplated that same may be inclined with respect to the horizontal plane and/or with respect to each other. The conveyor surface 33 preferably passes beneath and adjacent a suitable work station of any desired type for conducting a work operation on articles 21 supported on a conveyor surface 33 and passing therebeneath. In the particular embodiment shown, where the articles 21 are for purposes of illustration, battery grids, the work station 35 may be a grid pasting station of a conventional type arranged for applying paste to the grids 21 as they pass therebeneath.

The conveyor surface 33 preferably comprises the upper reach of an endless belt conveyor, generally indicated at 36, which extends rightwardly past the work station 35 from a point in the region of the transfer section 12, as generally indicated at 38 (FIG. 1) in broken lines. The belt conveyor 36 is rotatably driven from any convenient and conventional power source (not shown) at a fixed speed synchronized, as hereinafter described, with respect to the speed of the upper reaches 29 of input conveyor chains 24 and 25. In the particular embodiment shown, wherein the reaches 29 and output conveyor surface 33 are horizontal, the latter is preferably elevated somewhat above the former.

The transfer section 12 includes a pair of pickup disks 40 and 41 (FIGS. 1–5) located adjacent the sidewalls 17 and 18, respectively, and coaxially mounted on and for rotation with a shaft 42. The ends of the shaft 42 are mounted on the sidewalls 17 and 18 for rotation with respect thereto and by suitable and conventional bearings (not shown). A sprocket, indicated in broken lines at 43 in FIG. 1, is located near the midpoint of the shaft 42 and secured thereto for rotation therewith. The sprocket 43 is driven through a chain 44 by any convenient rotative drive means such as an electric motor (not shown), which is preferably synchronized with the drive for the belt conveyor 36 and conveyor chains 24 and 25 in a manner hereinafter described.

The pickup disks 40 and 41 carry teeth 46, four teeth per disk in the particular embodiment shown. However, a fewer number, such as two or a greater number, may be provided as desired and depending on the nature of the articles 21 handled. The same number of teeth are provided on each of the disks 40 and 41. The teeth 46 are evenly circumferentially spaced around the perimeter of the pickup disks 40 and 41. The disks 40 and 41 are circumferentially arranged on the shaft 42 in such a way that the leading edges 47 (FIG. 4) of the teeth 46 on the disk 40 are aligned, in parallelism with the shaft 42, with the leading edges 47 of corresponding teeth 46 on the disk 41. Thus, the leading edges 47 of corresponding teeth 46 on the disks 40 and 41 will simultaneously pass through the plane defined by the upper edge of the horizontal reaches 29 of the chains 24 and 25.

The disks 40 and 41 are driven, as seen in FIG. 1, in a clockwise direction, as indicated by the arrow C.

The leading edges 47 of the teeth 46 are preferably angled forwardly to some extent, for example between an angle of 0° and 35°, so that the outer peripheral end of the leading edge 47 preceeds the inner end of the leading edge 47 during rotation of the disks. The trailing edge 48 of each of the teeth 46 preferably extends, more or less smoothly, into the following peripheral portion of the corresponding disk. The height of the teeth 46, beyond the periphery of the disk and at the leading edge 47, is at least as great as the thickness of the articles or grids 21 and preferably exceeds same. Thus, in the particular embodiment shown, the height of the teeth 46 approximates the thickness of two of such grids 21. However, it will be noted that where it is intended that the disks pick up more than one article at a time, that the height of the teeth 46 should at least be equal to and preferably exceed the total thickness of the quantity of articles to be picked up at one time.

Thus, the pick up disks 40 and 41 in cooperation with remaining portions of the transfer section 12 hereinafter described, are adapted to pick up articles 21 from the vicinity of the rightward ends of the upper reaches 29 of the chains 24 and 25 by contact of the leading edges 47 with the ears 22 of the articles 21, moving such articles upwardly and forwardly and then allowing same to move downwardly onto the output conveyor surface 33.

A pair of guide rods 51 are supported by any convenient fixed means (not shown) below and rearwardly of the shaft 42 and extend upwardly past the rear face of the shaft, thereafter curving fowardly thereover to a point near the rearward end of the endless belt conveyor 36. The guide rods 51 substantially parallel the rearward reach of the drive chain 44 as well as the portion thereof contacting the sprocket 43 on the shaft 42 but are spaced outwardly from the shaft 42 somewhat therebeyond, though at a distance less than that of the teeth 46 on the pick up disks 40 and 41. Thus, the guide rods 51 slidably support the trailing or bottom edge of articles or grids 21 supported on the disks 40 and 41 as same are moved toward the output conveyor 36, preventing same from contacting the shaft 42 or drive chain 44 and causing same to assume a horizontal or substantially horizontal position prior to coming to rest upon the output conveyor surface 33.

Turning now to a portion of the transfer section 12 which comprises a primary aspect of the present invention, there is provided oscillating means which, in the particular embodiment shown, comprise a pair of scillating members 56 (FIGS. 4 through 8). The oscillating members 56 are disposed between the disks 40 and 41, one such oscillating member being disposed closely adjacent each such disk.

Figure 4:
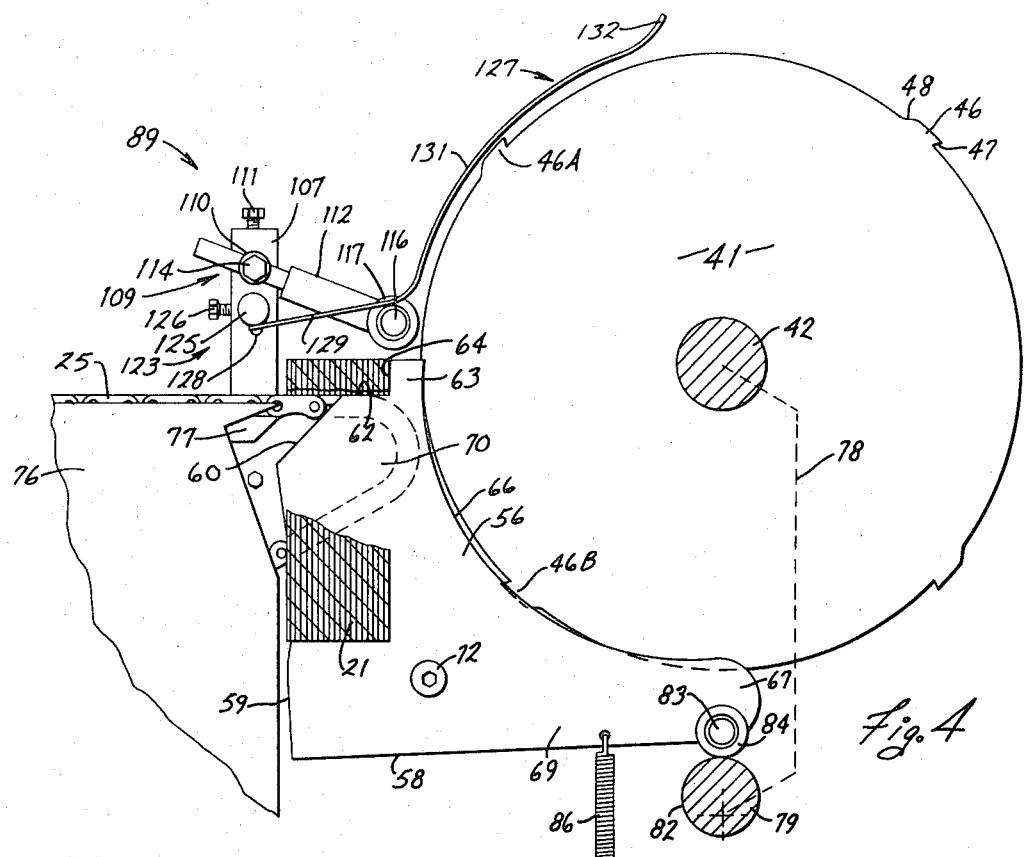
FIG. 4 is an enlarged, fragmentary, cross-sectional view substantially taken along the line IV—IV of FIG. 2 and showing the oscillating member in its lower, rightward limiting position.

The oscillating members 56 are preferably mirror images of each other and a description of one will thus suffice for both. Thus, as seen in FIG. 4, the oscillating member 56 is of generally L-shaped configuration having a preferably substantially flat bottom edge 58, and a rearward edge 59 which is substantially upstanding and which has a forwardly sloped upper portion 60. The oscillating member 56 further has a relatively short top or support edge 62 adjoining the sloped portion 60 and which is terminated at its forward end by an upstanding tab 63. The tab 63 has a rearwardly facing abutment edge 64. With the oscillating member 56 in its downwardmost or rearwardmost position shown in FIG. 4, the support edge 62 and abutment edge 64 are respectively substantially horizontal and vertical. The forward edge 66 of the oscillating member 56 is concavely curved through the majority of its length, extending from the tab 63 downwardly and then forwardly, on a curve substantially paralleling the periphery of the adjacent one of the pickup disks 40 and 41, to a convexly curved forward end 67 which adjoins the bottom edge 58. Thus, the oscillating member 56 is, in the particular embodiment shown, substantially L-shaped having a forwardly extending leg 69 hereinafter referred to as the drive leg, and upwardly extending leg 70 hereinafter referred to as the support leg.

Each of the oscillating members 56 is pivotally supported for movement in its own plane and hence in parallelism with the plane of rotation of the disks 40 and 41 by a suitable stub shaft 72 (FIGS. 4 and 7). The stub shaft 72 is fixedly supported on a portion 73 (FIG. 7) of the corresponding one of the sidewalls 17 and 18, such portion 73 comprising a substantially upstanding plate spaced outwardly of the plane of the adjacent disk, spaced inwardly somewhat from the remainder of the corresponding one of the sidewalls 17 and 18 and rigidly fixed to the latter by a suitable connecting portion 74 (FIG. 6). A further upstanding plate 76 is spaced inwardly from and parallel to each plate 73 and is substantially coplanar with the adjacent oscillating member 56. The plates 73 and 76 are joined by a rectangular section, longitudinally extending member 77 (FIGS. 4 and 7) forming an upwardly facing groove on which the corresponding one of the chains 24 and 25 is slidably carried. The forward ends of the rectangular cross-section members 77 terminate at a point spaced leftwardly from the oscillating members 56 and from the rightward ends of the upper reaches of the chains 24 and 25.

Each stub shaft 72 is located near the lower rearward corner of the corresponding oscillating member 56 constituted by the juncture of the edges 58 and 59 thereof. Thus, pivoting of the oscillating member 56 about the axis of the stub shaft 72 causes a corresponding arcuate movement of the drive leg 69 and support leg 70 thereof. Thus, the drive leg 69 follows a curved but substantially vertical path whereas the support leg 70 including the support edge 62 and abutment edge 64, moves through an arcuate path from its position in FIG. 4 both upwardly and forwardly to its position of FIG. 5.

A cam shaft 79 is fixedly supported for rotation with respect to the sidewalls 17 and 18 by means of bearings, one of which is shown at 80 (FIG. 7), secured to the plate 73 by any convenient means such as screws 81. The cam shaft 79 extends below and adjacent the forward end 67 of the oscillating member 56 and has an eccentric or cam surface 82 located beneath each of the oscillating members 56.

Each of the oscillating members 56 carries a stub shaft 83 upon which is supported a rotatable roller 84 which rolls on the cam surface 82 whereby, upon rotation of the cam shaft 79, the forward end 67 of the oscillating member 56 is caused to rise and fall to an extent determined by the eccentricity and diameter of the cam surface 82.

A spring 86 (FIG. 4) which in the particular embodiment shown is a coiled tension spring, is secured to the oscillating member 56 at a point spaced somewhat to the rear of the roller 84 and extends downwardly therefrom to a point of securement (not shown) fixed with respect to the frame structure 16 of the device 10 for resiliently holding the roller 84 against the cam surface 82.

Figure 5:
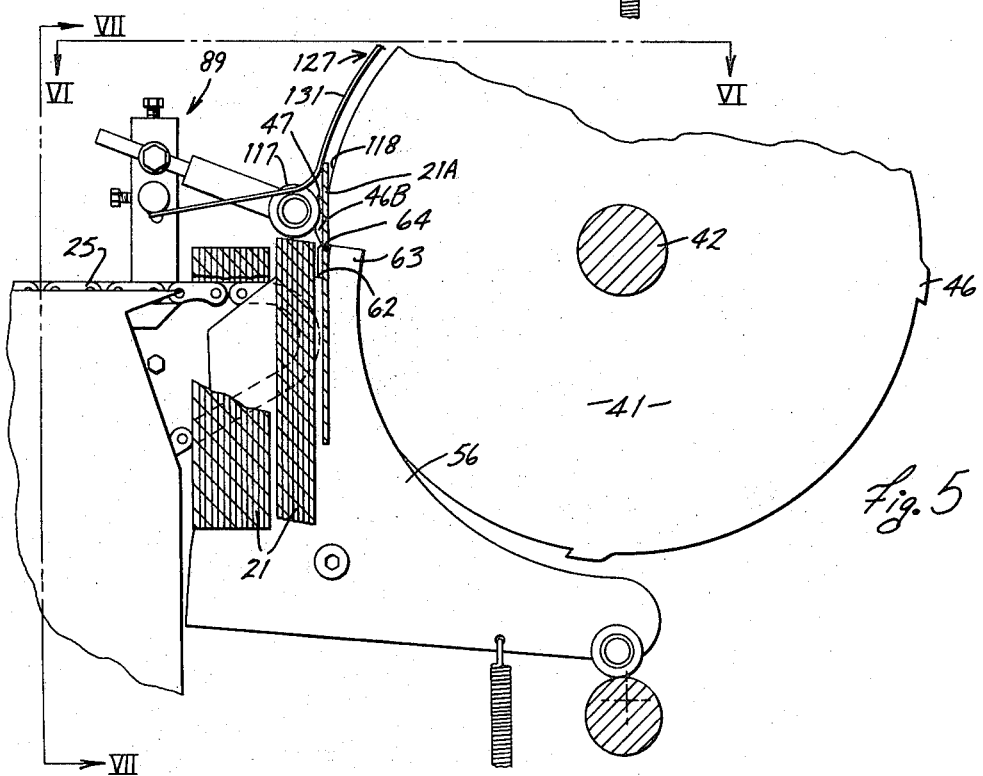
FIG. 5 is a view similar to FIG. 4 and showing the oscillating member in its upper, rightward limiting position.

In the particular embodiment shown, the eccentricity and diameter of the cam surface 82 is arranged so that when the cam surface 82 is at its maximum height, as shown in FIG. 4, the oscillating member 56 is in its fully counterclockwise position, the support surface 62 is substantially horizontal and is substantially in the plane of the top of the upper reaches 29 of the chains 24 and 25 and the abutment surface 64 is spaced rearwardly from the path of the teeth 46 on the disks 40 and 41. On the other hand, when the cam surface 82 is at its lowermost point, whereat the position of rotation of the shaft 79 is 180° from that shown in FIG. 4, and as shown in FIG. 5, the oscillating member 56 is in its fully clockwise position wherein the support surface 62 is spaced somewhat above the plane of the top of the upper reaches 29 of the chains 24 and 25, is sloped slightly forwardly and overlaps the path of the leading edges 47 of the teeth 46 on the disks 40 and 41 and wherein the abutment surface 64 lies forwardly of the adjacent path of the teeth 46, the tab 63 thus overlying the disks 40 and 41.

The cam shaft 79 is driven in synchronism with the shaft 42 by any convenient and conventional means as indicated by the broken line 78 of FIG. 4.

Guide-stop assemblies 88 and 89 (FIGS. 2–7) are provided on both sides of the device 10, outward of and adjacent the forward ends of the chains 24 and 25, respectively. The assemblies 88 and 89 are preferably mirror images of each other and hence a description of one will suffice for both.

Considering then the guide-stop assembly 89, same includes a base block 91 (FIG. 7) which is fixed to the plate 73 below the chain 25 by screws 92 and extends horizontally outwardly from the plate 73. The block 91 supports a stop unit 94 (FIGS. 6 and 7). The stop unit 94 includes a fixed block 95 secured atop the base block 91 by any convenient means such as welding and provided with a suitable bore (not shown) therethrough for receiving an adjustment screw 96 which extends forwardly therethrough. A generally Z-shaped stop member 97 comprises a central and forwardly extending portion 98, a screw receiving portion 99 located at the rearward end of the central portion 98 and a stop block 101 located at the forward end of the central portion 98.

The screw receiving portion 99 extends laterally outwardly from the central portion 97, away from the plate 73, and is provided with a threaded opening (not shown) for receiving the screw 96. The screw receiving portion 99 is located forwardly of the fixed block 95, its spacing therefrom being determined by rotation of the screw 96. The stop member 97 is supported by the screw 96 and also on the upper edge of plate 73 as hereinafter discussed and is prevented from rotation about the longitudinal axis of the central portion 98 by contact with the upper face of base block 91.

The stop block 101 extends laterally inwardly from the central portion 98 above the forward portion of the plate 73 and into close spaced adjacency where the laterally outer face of the pickup disk 41 adjacent the periphery thereof. The stop block 101 preferably rides along the top of the plate 73 in sliding supported relation thereon, the stop block 101 being fixed to an elevated forward end portion of the central portion 98. Thus, rotation of the screw 96 will, through the resultant forward or rearward motion of the screw receiving portion 99 and central portion 98 of the stop member 97, cause forward and rearward motion of the stop block 101 along the top of the plate 73.

The stop block 101 has a rearwardly extending, preferably vertical stop face 102 adjacent the laterally inner end thereof, which lies closely adjacent the periphery of the disk 41. Upon proper adjustment of the screw 96, the stop block 101 is normally positioned, as seen in FIG. 8, at a distance forwardly of the path of the outer extremity of leading face 47 of the tooth 46 on the adjacent pickup disk 41, which distance is slightly greater than half the width of the article 21 or rearwardmost of several articles 21 to be picked up at one time by the pick-up disks. Thus, the rearwardly facing stop face 102 is normally positioned intermediate the outer and inner ends of the leading tooth edge 47 when the corresponding tooth 46 is in its position of FIG. 8, that is, in a position adjacent the upper edge 29 of the input conveyor chains 24 and 25. Since the stop face 102 is positioned laterally very closely adjacent the disk 41, it is in the path of the ears 22 of the article 21 so that the articles 21 can be moved no farther forwardly than the stop face 102 until same are picked up by the teeth 46 on the pickup disks 40 and 41 and moved upwardly beyond the stop block 101. The stop face 102 extends upwardly beyond the plane of the top face of the upper reaches of the chains 24 and 25 by a distance approximating the height of the ears 22 on the articles 21, which in the present embodiment is very small fraction of the radius of the pickup disks 40 and 41.

The guide-stop assemblies 88 and 89 each further include a guide unit, the guide unit associated with the guide-stop assembly 89 being indicated at 105. The guide unit 105 includes a preferably substantially rectilinear support bar 107 which is fixed to and extends upwardly from the base block 91, the top of the support bar 107 being, in the particular embodiment shown, located above the plate 73 in spaced relationship thereto and also above the shaft 42.

A guide roller support 109 (FIGS. 4, 6 and 7) includes a pin 110 which is rotatably and slidably located within a hole (not shown) which extends laterally through the support bar 107 adjacent the upper end thereof. A set screw 111 threadedly engages a suitable opening (not shown) in the upper end of the support bar 107 for engaging the periphery of the pin 110 for holding same in a fixed position of adjustment. An arm 112 extends slidably through a diametral opening 113 in the pin 110. The opening 113 is located adjacent the rightward (as seen in FIG. 7) end of the pin 110 approximately in alignment with the pickup disk 41. A set screw 114 threadedly engages an axial opening in the rightward (FIG. 7) end of the pin 110 for engaging the opposed face of the arm 112 so as to hold same in fixed location with respect to the pin 110. The arm 112 extends forwardly and downwardly from the pin 110, terminating above the oscillating member 56 and adjacent the orbit of the teeth 46 on the pickup disk 41 as seen in FIG. 4. The forward end of the arm 112 supports a laterally inwardly extending stub shaft 115 upon which is rotatably mounted a guide roller 117.

The guide roller 117 is located laterally inwardly of the pickup disk 41 and in close spaced relationship therewith. A portion of the periphery of the roller overlaps the orbit of the outer edges of the teeth 46. The bottom of the roller 117 lies in close spaced relationship above the articles 21 for urging the one (or several) of the articles 21 picked up at a given time by a tooth 46 fully onto the leading edge 47 of such tooth and against the adjacent leading peripheral portion of the wheel 41 (FIG. 8) as the ear 22 of such article 21 is raised by the rotation of the pickup disk 41 above the stop face 102.

A guide leaf support 123 (FIGS. 4, 6 and 7) includes a pin 125 which parallels the pin 110 and is located therebelow. The pin 125 extends rotatably and slidably through a suitable opening (not shown) in the upstanding support bar 107 and is secured fixedly thereto in a desired position of adjustment by a set screw 126 which extends forwardly through a suitable threaded opening (not shown) in the rearward face of the support bar 107 into locking contact with the opposed periphery of the pin 125.

The pin 125 extends laterally inwardly beyond the guide roller 117. A leaf spring 127 is secured at its rearward end to the underside of the pin 125 by any convenient means such as screws 128. The leaf spring 127 comprises a rearward end portion 129 (FIG. 4) which is, in the particular embodiment shown, substantially flat and extends forwardly from the pin 125 at a shallow upward angle. The intermediate portion 131 of the spring 127 extends upwardly and forwardly from the rearward portion 129 and is smoothly curved approximately about the axis of the shaft 42, lying at a distance therefrom approximately equal to but slightly greater than the radius of the tip of the teeth 46. The forward end or tip portion 132 of the spring 127 is preferably upwardly curved by a small amount.

When properly positioned as shown in FIG. 4, the curved portion 131 of the leaf spring contacts the upper edge of the one or ones of the articles 21 supported on the adjacent tooth of the pickup disk 41 and urges same into firm contact with the one of the teeth 46 supporting same, at least until the article 21 has moved to a position substantially above the shaft 42, for the purpose of preventing the article or articles from being dislodged from such tooth 46.

OPERATION

Although the operation of the device described above has been substantially indicated above, same will now be summarized to assure a clear understanding of the invention.

Preparatory to operating the device 10, the guide-stop assemblies 88 and 89 are, if necessary, adjusted. More particularly, the screw 96 may be rotated to shift the stop member 97 forwardly or rearwardly as required to properly position the stop face 102 with respect to the orbit of the leading tooth edges 47 of the pickup disks 40 and 41. When so properly positioned, the stop face 102 is located as shown in FIG. 8 (where, for example, one article 21 is to be picked up at a time). Thus, as shown in FIG. 8, the stop face 102 is spaced rearwardly from the peripheral portion 118 of the pickup disk 41 and is spaced forwardly of the free end of the leading edge 47 by a distance corresponding to somewhat more than one-half the thickness of the article 21 but less than the entire thickness thereof. This way, the leading edge 47 can contact and pick up only one such article 21 at a time, that being the forwardmost one 21A thereof. The leading edge 47 thus cannot contact and pick up the adjacent article 21B.

During this adjustment of the stop member 97, the bottom face of the stop block 101 rides smoothly along the horizontal upper surface of the plate 73, the stop block 101 thus retaining a constant height or altitude during the adjustment process.

To properly position the guide roller 117, the set screw 111 may be loosened and the pin 110 rotatably and/or axially adjusted to position the guide roller 117 so that it is located preferably slightly inwardly of the corresponding and adjacent pickup disk 41. The set screw 114 may be loosened to allow positioning of the roller 117 at a proper radial distance from the pin 110. When proper adjustment is achieved, the set screws 111 and 114 are retightened to hold the roller 117 in fixed position. As a result of the foregoing adjustment, the roller 117 is properly located in a position just spaced above the highest position of the top of the articles 21 when the latter are supported on the support edge 62 of the oscillating member 56 as shown in FIG. 5. Further, the correct position of the roller 117 places the forwardmost portion of its periphery in overlapping relationship with the orbit of the outer edge of the teeth 46 on the pickup disk 41. When so positioned, the roller 117 will contact an article (or articles) 21 picked up by a tooth 46 just after such article has left the oscillating member 56 and will urge such article inwardly along the leading edge 47 of the tooth into firm contact with the adjacent peripheral portion 118 of the pickup disk, thus causing the article to shift from a position on the tooth where it is only partially supported thereby to a position where it is most firmly supported by the tooth.

The guide leaf 127 is adjusted and positioned by loosening of the set screw 126 to allow rotation and axial shifting of the pin 125. When properly positioned the leaf spring 127 is spaced laterally inwardly from the adjacent disk 41 as shown in FIG. 7 and the curved portion 131 thereof lies substantially on a constant radius from the axis of the shaft 42 as illustrated in FIG. 4 and at a location spaced slightly outwardly from the path of the outer peripheral edge of the teeth 46 so as to prevent articles 21 supported by the teeth, during the upward movement thereof from the oscillating member 56, from becoming disengaged from such teeth.

With the above adjustments made, a plurality of articles 21, such as storage battery grids, may be placed on the input chains 24 and 25, same preferably though not necessarily being placed adjacent the forward end of the chains. Thereafter, the drive means (not shown) for the chains 24 and 25, the belt conveyor 36, the disks 40 and 41 and the oscillating members 56 may be started. Further articles 21 may be placed on the chains 24 and 25 at any time. The work station 35 may be activated either at this point or as articles 21 appear thereunder, depending upon the character of the work station.

The above-mentioned chains 24 and 25, belt conveyor 26, disks 40 and 41 and oscillating members 56 are preferably driven from common power source (not shown) by any convenient means, the belt conveyor 36, disks 40 and 41 and the oscillating members 56 preferably being positively connected to such drive source, for example, by means such as a chain or gear drive, as exemplified by the disk drive chain 44, since it is desired that the aforementioned members operate in synchronism.

Such synchronism will be achieved if the speeds of the several aforementioned entities are properly related as hereinafter discussed. More particularly then, for a desired number G of articles or grids 21 passing beneath the work station 35 per unit time, the lineal speed $V_{oc}$ of the conveyor belt 36, and hence of the conventional rotative drive therefor, may be determined from the following relation:

$$V_{oc} = G(H+S)$$

where $H$ represents the height of the article or grid (considered in its vertical position as in FIG. 2) and $S$ represents the desired spacing between grids on the upper conveyor surface 33.

The rotative speed $D$ of the disks 40 and 41 and hence of the shaft 42 is given by the relation:

$$D = G/N$$

where $N$ is the number of teeth 46 per disk.

The rotative rate of the cam shaft 79 which actuates the oscillating member 56 is merely G, the rate of grid flow per unit time past the work station 35.

Finally, the speed $V_{ic}$ of the input chains 24 and 25 is represented by the relationship:

$$V_{ic} > WG$$

where $W$ is the thickness of the grids or articles 21.

The input chains 24 and 25 may be operated continuously and thus run at a constant speed. In such case, the speed $V_{ic}$ of the chains 24 and 25 typically will be in the range of 2 to 30 percent greater than WG.

Alternatively, the input chains 24 and 25 may be operated intermittently by any conventional means, in which case the speed $V_{ic}$ in the above relationship will be an average speed over the plurality of such periodic actuations. In the case of intermittent actuation it is preferred that for grids of .050 inch to .100 inch thickness that the chains be advanced linearly a distance of approximately .300 inch per actuation and that for grids of greater than .100 inch thickness that the grids be advanced a maximum of approximately .625 inch linear travel per actuation, the chains being advanced by the abovementioned distances once per cycle of the oscillating members 56. The distance of chain advancement per cycle of the oscillating member 56 will in each case be greater than the individual thickness of the grids. Advancing the chains 24 and 25 in such an intermittent manner normally will reduce the tendency of the chains to frictionally wear away the lower edge of the ears 22 on the articles 21, which may be of importance where the grids or plates 21 are of soft materials such as lead or the like whereas the operation of the chains continuously particularly at a speed substantially greater than required to deliver articles 21 to the oscillating members 26 in a timely manner may tend to excessively wear the undersides of grids or plates of such soft materials. Whether operated continuously or intermittently as above described, the speed of the input chains is synchronized with that of the oscillating members 56 and so forth by driving same in any conventional and convenient manner.

The stack of articles or grids 21 is moved forwardly on and by the chains 24 and 25, the leading several thereof being passed by the chains onto the support edges 62 of the oscillating members 56, when the latter are in their downward position of FIG. 4, and into snug contact with the abutment edges 64 thereof. The forward movement of the upper reaches of the chains 24 and 25 in accordance with the above-mentioned speed relationship maintains the articles 21 snugly packed against the abutment surface 64. The shaft 42 and cam shaft 79 are so synchronized that the oscillating member 56 will be in its lowermost position shown in FIG. 4 when the portion of the disk 41 adjacent the upper end of the oscillating member 56 is approximately evenly spaced between teeth 46 on the disk 41, such teeth being indicated at 46A and 46B for convenience in reference.

Thereafter, continued rotation of the shafts 42 and 79 causes the tooth 46B to rise and causes the oscillating member 56 to pivot in a clockwise direction, moving the supporting, or lifting, edge 62 thereof upwardly above the upper surface of the chains 24 and 25 and forwardly toward the periphery of the disk 41. The oscillating member 56 reaches its upwardmost and forwardmost position shown in FIG. 8 as the tooth 46B rises to the level thereof.

In the position of the elements shown in FIG. 8, several, here eight, of the articles 21 are supported on the support edge 62 of the oscillating member 56, whereas the remaining articles 21 are spaced rearwardly therefrom and are not pressed into contact therewith by the chains 24 and 25 due to contact thereof with the forwardly sloped upper portion 60 of the oscillating member 56. Thus, the several articles 21 on the support edge 62 of the oscillating member 56 are no longer pressed tightly together by the forward movement of the upper reaches of the chains 24 and 25 or by the remaining and rearwardly disposed further articles 21 supported by such chains. Thus, the articles 21 carried on the support edge 62, although nested closely together, are not urged together by any large or significant force. Consequently, the ones of the articles 21 supported on the support edge 62 do not tend to stick together as they otherwise would and thus may be freely picked up one at a time (or several at a time if the length of the tooth 46B protruding beyond the stop face 102 permits). The stop edge 102, in the particular embodiment shown, extends forwardly beyond the portion 118 of the periphery of the disk 41 sufficiently that the remaining length of the leading edge 47 extending therebeyond is less than the thickness of one of the articles 21. Thus, the tooth 46B engages only the forwardmost one 21A of the articles and does not engage the remaining ones thereof.

As a result, the tooth 46B will pick up, on the tip of its leading edge 47, the forwardmost one of the articles 21A as the disk continues to rotate in a clockwise direction, leaving the remainder of the articles 21 including the article 21B supported by the support edge 62.

During the time that the tooth 46B moves into contact with the article 21A and lifts same from the support edge 62, the abutment edge 64 is spaced well forwardly of the stop face 102 and thus does not interfere with the tooth 46B picking up the forwardmost article 21A.

The oscillating member 56 remains in or substantially in its forwardmost position with the abutment edge 64 located forwardly of the stop face 102 at least until the pickup disk has rotated sufficiently, toward its position in FIG. 5, to cause the ears 22 of the article 21A to be located above and clear the abutment edge 64. Once such clearance has been achieved, the oscillating member 56 may begin its counterclockwise or return pivotal movement toward its starting position abovementioned of FIG. 4.

As the forwardmost article 21A is raised from the abutment surface 62 by the tooth 46B, the ear 22 of such article is supported substantially upon the outermost tip of the tooth 46B, partially overhangs the tooth and is spaced from the adjacent disk peripheral portion 118. The article 21A, as it rises with the tooth 46B toward its position of FIG. 5, is contacted on its rearward face by the guide roller 117 and as the upper edge of such article moves upwardly past the roller 117, said roller urges the ear 22 of the article radially inwardly along the leading edge 47 of the tooth 46B into contact with the peripheral portion 118 of the disk so that the article 21A is more securely and reliably supported by the tooth 46B and is spaced inwardly from the tip of the leading edge 47.

A further incremental clockwise rotation of the disks 40 and 41 brings the upper edge of the article 21A into contact with the curved portion 131 of the leaf spring 127 as indicated in FIG. 5. A continued incremental rotation of the disk 41 past its position of FIG. 5 maintains the upper edge of the article 21A in contact with the leaf spring portion 131 thus further preventing any tendency of the article 21A to become dislodged from the tooth 46B and also tending to assist the article 21A in assuming a forwardly sloped rather than strictly vertical position as the article 21A, during continued rotation of the disks 40 and 41, reaches its uppermost position shown in FIG. 1.

Figure 3:
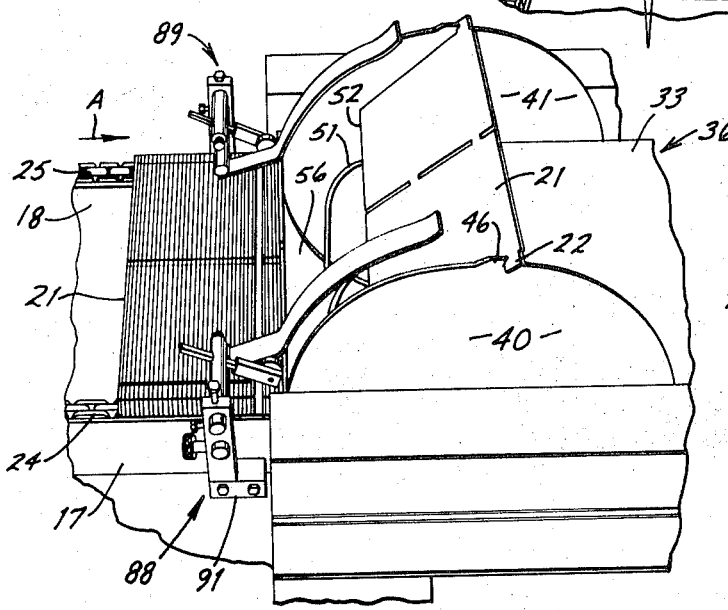
FIG. 3 is a three-quarter, top pictorial view of the central portion of the device of FIG. 1.

In the particular embodiment shown, each of the disks 40 and 41 has four evenly spaced teeth so that as a tooth 46 approaches its uppermost position as indicated in FIG. 3, the adjacent and following tooth 46 will be moving into the position of the tooth 46B shown in FIG. 8 and as above described, whereby the abovementioned process of picking up a further article 21 is repeated.

As the article 21 is carried upwardly toward and past its uppermost position shown in FIG. 3 the trailing edge 52 thereof rides on the guide rods 51 further tending to tip same from a vertical to an angled position as shown in FIG. 3. Thereafter, continued rotation of the disks 40 and 41 causes the article to be deposited upon the output conveyor surface 33 which transfers same in the direction B indicated in FIG. 1 toward and past the work station 35 whereat any convenient work operation such as a pasting operation in the case of a battery grid may be carried out.

Although the above discussion has been in terms of a stack of articles 21 it will be noted that the articles 21 may be placed upon the conveyor chains 24 and 25 one at a time, said chains causing such an article to move onto the support edge 62 of the oscillating members 56 into abutment with the abutment edge 64 thereof for being picked up by the corresponding teeth of the pickup disks 40 and 41.

MODIFICATIONS

It is contemplated that the variety of output sections may be utilized instead of that shown at 13 in FIG. 1. Examples of such modified output sections are illustrated in FIGS. 9 and 10.

In the description of the following modifications, parts identical or substantially identical to parts of the apparatus of FIGS. 1 through 8 above described will carry the same reference numeral thereas. Parts of the apparatus which are generally similar but modified will carry the same reference numerals with an added letter suffix.

Figure 9:
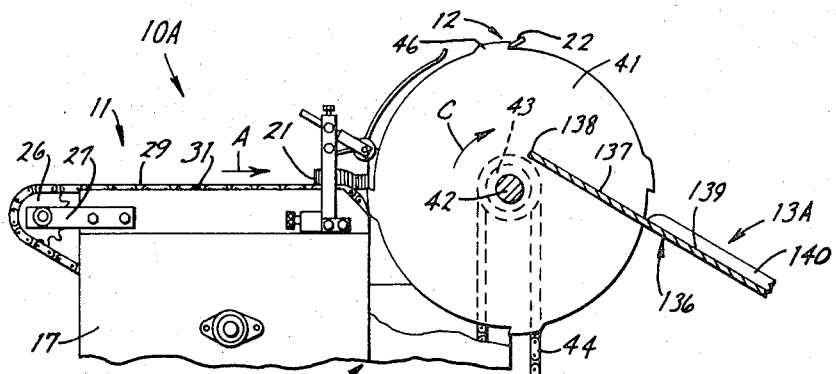
FIG. 9 is a view similar to FIG. 1 and disclosing a modification.
Figure 10:
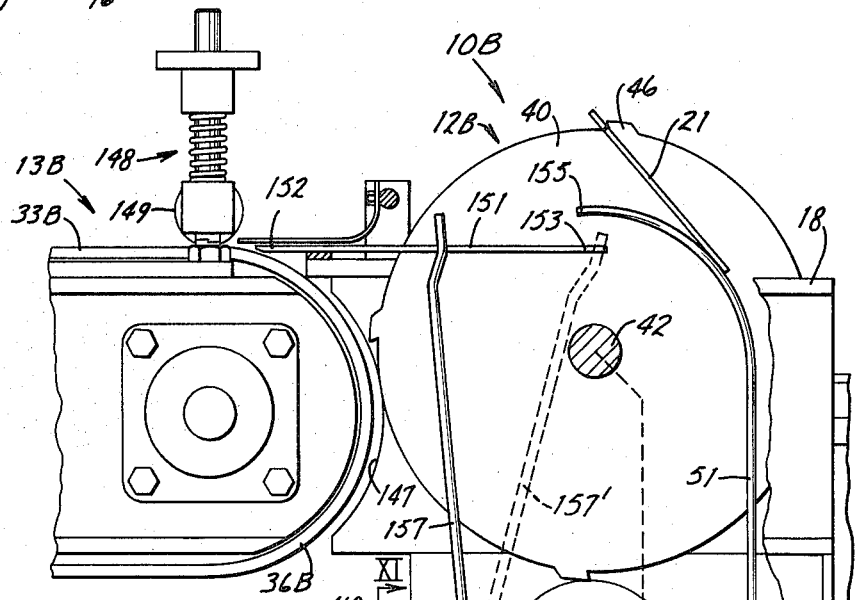
FIG. 10 is a fragmentary, partially broken side elevational view of a modified grid feeder device.

FIG. 9 discloses a modified device 10A which differs from the device 10 of FIG. 1 in the output section 13A thereof. The modified output section 13A consists of a downwardly and forwardly angled and substantially platelike slide or chute 136 having an upper or rearward portion 137 disposed between the disks 40 and 41, the rearward end 138 of the chute 136 being spaced close above the upper end of the chain 44 and adjacent and below the ends of the guide rods 51 (shown in FIG. 2). If desired, the forward portion 139 of the chute 136 may be widened to a width exceeding the spacing of the disks and the width of the articles 21 and provided with upstanding sidewalls 140 for preventing sideward motion of the articles 21 off the chute 136.

Thus, articles carried by the disks 40 and 41 will be deposited thereby on the chute 136 and will slide forwardly and downwardly therealong to a desired location for processing of the like.

Figure 11:
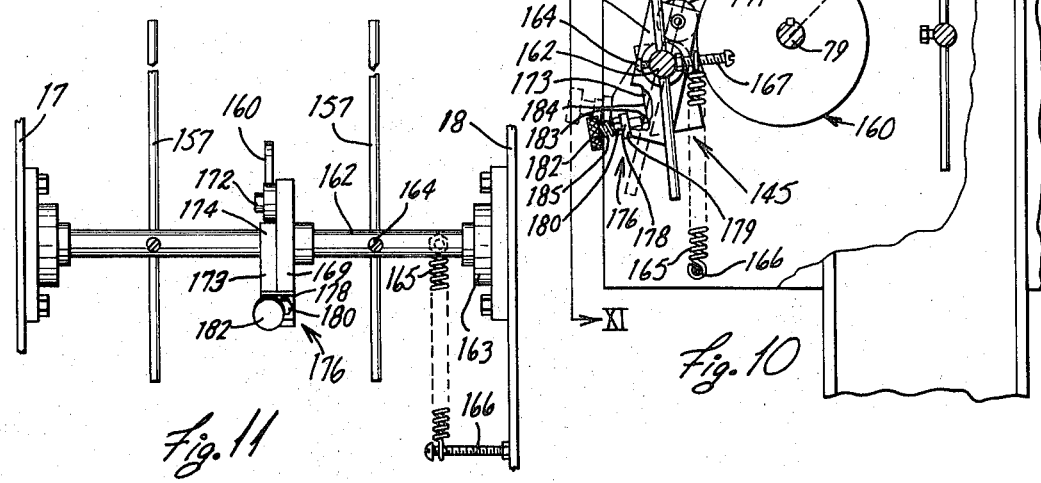
FIG. 11 is a sectional view substantially taken on the line XI—XI of FIG. 10.

Turning now to a further modification, FIGS. 10 and 11 disclose a modified device 10B having a modified output section 13B and a transfer section 12B modified by inclusion of a discharge assist assembly 145 arranged for assisting the discharge of articles 21 from the disks 40 and 41 and onto the output section 13B.

The output section 13B includes an endless belt conveyor 36B having an upper reach 33B disposed above the shaft 42 supporting the disks 40 and 41, the disk 40 being shown in FIG. 10. The rearward or rightward end 47 of the belt conveyor 36B is spaced from the shaft 42 by a distance substantially equal to the diameter of the disks 40 and 41. If desired, an article holddown device 148 may be provided at each side of the rearward or input end of the conveyor 36B for snugly holding incoming articles against the upper reach 33B thereof, here by means of rollers 149.

The discharge assist assembly 145 includes an article support plate 151 spaced between the sidewalls 17 and 18 of the frame of the device 10B, and supported in fixed relation thereto by a cross bar 150 at the forward end thereof. The forward or leftward end 152 of the plate 51 overhangs the rearward end 147 of the conveyor 36B and the rightward or rearward end 153 of the plate 151 is disposed below the upper or forward end 155 of the guide rods 151.

The discharge assist assembly 145 further includes a laterally spaced pair of substantially upstanding discharge rods 157 (FIGS. 10 and 11), disposed on opposite sides of the plate 151, and support and actuating means 158 therefor.

The support and actuating means 158 includes an eccentric or cam 160 fixedly mounted on the cam shaft 79 discussed above in connection with FIGS. 4 and 5, the cam 160 preferably being disposed substantially centrally on the cam shaft 79. A rocker shaft 162 extends between and is pivotally mounted on the sidewalls 17 and 18 by bearings 163. The rods 157 extend through suitable openings in the rocker shaft 162 and are here longitudinally adjustably anchored thereon by set screws 164. A tension spring 165 extends between a mounting bolt 166 on the sidewall 18 and a further bolt 167 fixed to and extending radially and rearwardly from the shaft 162 for resiliently biasing the shaft 162 and rods 157 in a rearward or clockwise direction. A cam follower arm 169 is pivotally mounted adjacent the central portion on the rocker shaft 162 for pivotal movement with respect thereto. The cam follower arm 169 is held against axial movement along the shaft 162 by any convenient means not shown. A roller 171 is rotatably mounted by a screw 172 adjacent the upper end of the cam follower arm 169 in opposition to the periphery of the cam 160 and is adapted to bear thereon. A further arm 173 is fixed to the rocker shaft 162 by a set screw indicated in broken lines at 174 and is disposed adjacent the cam follower arm 169, the further arm 173 normally depending from the shaft 162. The cam follower arm 169 is adapted for pivoting the arm 173 and hence the shaft 162 in response to rotation of the cam 160 by a lost motion connection 176.

The lost motion connection 176 comprises a plate 178 secured by a screw 180 to an angled portion 179 on the forward face of the cam follower arm 169 adjacent the bottom end thereof. The plate 178 laterally overhangs the further arm 173. A manually adjustable screw 182 threadedly engages and extends through the overhanging portion of the plate 178, the tip 183 of the screw 182 being adapted to abut the forward face 184 of the further arm 173. A spring 185 is provided on the screw 182 between the plate 178 and the head thereof for resiliently biasing the screw 182 outwardly or forwardly with respect to the plate 178.

The use of the lost motion connection between the discharge rods and the cam follower arm allows, by adjustment of the screw 182, adjustment of the end points of the path of the discharge rod, as may be desired for adapting the device 10B to handle articles 21 of different heights without changing the cam 160.

Considering the operation of the device 10B, as an article 21 is advanced forwardly by the disks 40 and 41 to its position shown in FIG. 10, the rods 157 will be in their forwardmost position shown in solid lines. As rotation of the shafts 42 and 79 continues in a clockwise direction, the article 21 will be advanced further forwardly with its rearward edge moving along the upper portion of the guide rods 51 toward the forward ends 155 thereof. Simultaneously, rotation of the cam 160 reduces the radius thereof presented to the roller 171. Thus, the spring 165 pivots the rocker shaft 162, discharge rods 157 and arms 173 and 169 in a clockwise direction from their positions shown in FIG. 10. After the cam has rotated through approximately a half circle from its position shown in FIG. 10, the discharge rods 157 will reach their rearwardmost limiting position indicated in broken lines at 157' whereat the upper ends thereof are disposed inwardly of the curve of the guide rods 51 and are spaced somewhat rearwardly from the support plate 151.

At approximately the time that the discharge rods 157 reach their rearwardmost position 157' or slightly thereafter, the article 21 will be advanced forwardly sufficiently by the disks 40 and 41 that the rearward end thereof will drop from the ends 155 of the guide rods 51 onto the support plate 151 adjacent the rearward end 153 thereof. Continued rotation of the disks 40 and 41 and of the cam 160 then causes the radius of the cam 160 presented to the roller 171 to increase, pivoting the cam follower arm 169 in a counterclockwise direction and through the lost motion connection 176 correspondingly pivoting the further arm 173, shaft 162 and discharge rods 157 for moving the rods 157 forwardly into contact with the rearward edge of the article 21. Continued counterclockwise or forward movement of the discharge rods 157 urges the article 21 forwardly along the support plate 151 so that the ears 22 thereof move radially outwardly beyond the path of the teeth 46 of the disks 40 and 41 while the teeth 46 which previously engaged the article 21 are still well spaced above the plate 151.

Continued rotation of the disks 40 and 41 and cam 160 returns the discharge assist assembly 145 and hence the discharge rods 157 to their forwardmost position shown in solid lines in FIG. 10, whereat the forward end of the article 21 will have been moved off the plate 151 and between the pressure rollers 149 and belt 36B. Thus, the belt 36B frictionally engages the article 21 with sufficient force as to carry same forwardly with the upper reach 33B thereof.

The above cycle of operation repeats for each article 21 presented to the discharge rods 157 by the disks 40 and 41.

The above described portion of the device 10B assures that each article 21 will be positively disengaged from the disks 40 and 41 and substantially positively engaged with the belt 33B. The presentation of each article 21 to the belt 33B is thus positively and precisely timed in relation to the rotation of the disks 40 and 41 by the movement of the discharge rods 157, which is positively synchronized with the rotation of the disks 40 and 41, to precisely maintain a predetermined spacing between articles 21 on the upper reach 33B of the output conveyor 36B.

FIGS. 12 through 22 disclose a further modified device 10C corresponding to the device 10 of FIG. 1. Parts of the modified device 10C similar to corresponding parts of the device 10 will carry the same reference numerals thereas with suffix "C" added thereto. The following discussion deals with the modified structure which primarily comprises modified peripheral edges on the pickup discs in the transfer section 12C, modified guide stop assemblies, one of which is indicated at 88C in the transfer section 12C and modifications in the output section 13C.

Figure 16:
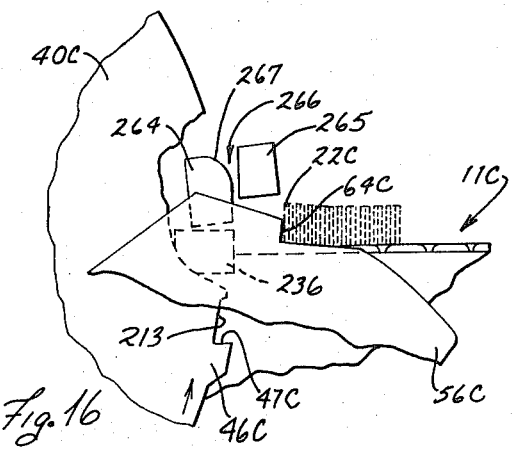
FIGS. 16, 17 and 18 are fragmentary sectional views each taken substantially on line XVI—XVI of FIG. 15 and showing the apparatus in succeeding and different positions of operation.

First considering modifications in the transfer section 12C, the pickup discs 40C and 41C, are as shown for example as to pickup disc 40C in FIGS. 12 and 16, provided with notches 213 in the periphery thereof immediately ahead of the leading edges of the teeth 46C. Each such notch lengthens the leading edge 47C of the corresponding tooth 46C to enable more secure location of the ear 22C of a grid thereon. The notch 213 is of sufficient length to fully receive the ear 22C of a grid without binding.

Further, the number of teeth 46C on the periphery of each disc is doubled. For a given grid transfer rate, this enables the discs to rotate at half the speed of the discs of the embodiment of FIG. 1 and reduces the acceleration of the relatively fragile grids as they are transferred between the sections 11C, 12C and 13C.

In addition, the guide stop assemblies are modified. As in the embodiment of FIG. 1 a pair of such modified guide stop assemblies are provided, one on each side of the device 10C, and are preferably mirror images of each other. Thus, disclosure of one such modified guide stop assembly 88C will suffice for both.

The modified guide stop assembly 88C (FIGS. 13 through 15) comprises an actuating unit 218 and a support unit 219.

The support unit 219 includes a plate 221 carried on the exterior face of the portion 73C of the machine sidewall adjacent the upper edge thereof and adjacent the rearward edge of the disc 40C. The plate 221 is horizontally adjustable toward and away from the disc. More particularly, a horizontal slot 224 in the mounting plate 221 slidably receives a support pin 226 fixed to the sidewall portion 73C. A block 227 is secured to the side plate portion 73 to the rear (left as seen in FIG. 13) of the mounting plate 221. A further block 228 is fixed to the mounting plate 221 adjacent the rearward edge thereof in spaced opposed relation to the fixed block 227. An adjustment screw extends forwardly through an opening not shown in the block 227 and threadedly engages the block 228. A manually engageable head 231, including a polygonal (here hexagonal) index portion 213, at the rearward end of the screw abuts the rear of the block 227. A leaf spring 233 on the block 227 engages the index portion 232 for preventing unintended rotation of the screw. A coil spring 234 is telescoped over the threaded portion of the screw 230 between the blocks 227 and 228 for maximizing the spacing therebetween to the extent allowed by the threads and the index portion of the screw 230. Thus, the mounting plate 221 is positively but forwardly and rearwardly adjustably mounted on the sidewall portion 73C of the machine.

A stop block 236 overhangs the inboard face of the sidewall portion 73C and is fixed by a spacer 237 and screws 239 to an upstanding portion 238 of the mounting plate 221. The stop block 236, pin 236 and screw 230 thus cooperate to secure the plate 221 in a fixed but adjustable position on sidewall portion 73C. The rearward face of the stop block is, as seen in FIG. 14, spaced forwardly from the orbit of the tip of the disc tooth 46C substantially by the thickness of the grid ear 22C.

The guide stop assembly 88C further includes an adjustable orifice assembly 243 (FIGS. 13 to 15) for positively moving a grid ear 22C carried on the tip of a disc tooth 46C into the adjacent notch 213 to positively locate the grid ear on the disc. The orifice assembly 243 comprises an upstanding inner pivot arm 246 spaced outboard of the sidewall portion 73C of the machine and mounted adjacent its lower end by a screw 247 for pivotal movement in a plane parallel to such side wall portion 73C the screw 247 is threadedly fixed to the mounting plate 221 adjacent the lower edge thereof. Spacers 248 on the screw 247 determine the transverse separation of the pivot arm 246 and disc 40C. A limit screw 251 (FIG. 13) threadedly engages the inner pivot arm 246 and extends rearwardly therefrom into abutting contact with the block 228 to provide an adjustable rearward limit to pivotal movement of the pivot arm 246.

An outer, generally upstanding pivot arm 243 pivotally mounts on the outer face of the inner pivot arm 246 by means of a pin 254. A screw 256 extends through a slotted opening 257 in the outer pivot arm, above the pin 254 and threadedly engages the inner pivot arm 246 to fix said arms together at a desired angle.

Figure 17:
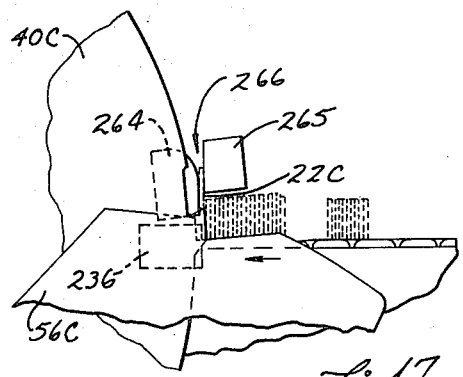
Figure 18:
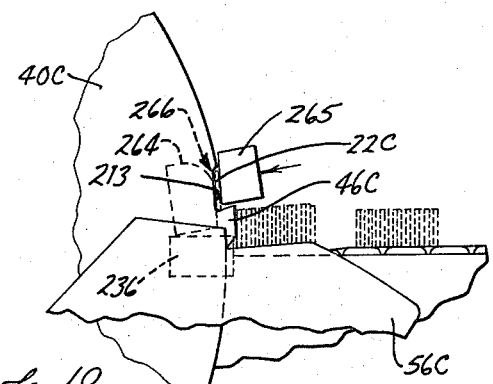

Substantially L-shaped, forward and rearward orifice members 261 and 262, respectively, (FIG. 14) have substantially parallel and transversely extending leg portions fixed, as by welding, to the forward and rearward edges of the inner and outer pivot arms 246 and 253, respectively. The parallel legs of the orifice members 261 and 262 extend inboard and terminate above the machine side wall portion 73C and stop block 236 in preferably coplanar orifice defining elements 264 and 265, respectively, which extend respectively rearwardly and forwardly toward each other for defining a substantially vertical gap or orifice 266. The orifice is adapted to receive the ear 22C of a grid 21C as seen in FIGS. 14, 17 and 18. The orifice defining edge of the forward element 264 is preferably rounded at its upper corner, as indicated at 267, to prevent interference with a grid ear 22C moving upwardly out of the orifice 266. The bottom edge of the forward orifice element 264 is close spaced above the stop block 236 while the corresponding lower edge of the rearward orifice element 265 is spaced thereabove to provide adequate clearance for further grid ears 22C on the oscillating member 56C.

The legs of the orifice members 261 and 262 extend outboard of the arms 246 and 253 and are jointed by an adjustment screw 268 (FIG. 14) which upon rotation, after loosening of the screw 256, relatively pivots the arms 246 and 253 to set the separation of the L-shaped orifice members and thereby the width of the orifice 266. A spring 269 telescoped over the screw 268 resiliently urges the L-shaped orifice members 261 and 262 apart to the extent allowed by the adjustment of said screw 268.

An upward extension 271 (FIG. 13) of the inner pivot arm 246 connects through a linkage system 272 to the actuating unit 218. In the particular embodiment shown, the linkage system 272 comprises a link 273 secured by a screw 270 to the arm extension 271 for pivotal movement in a vertical plane, and a further link 275 pivotally connected by a screw 276 to the free end of the link 273 and extending rearwardly therefrom.

The actuating unit 218 includes an upstanding, here substantially T-shaped, mounting plate 279 fixed to the side wall portion 73C to the rear of the support unit 219. The T-shaped plate 279 carries suitable motive power means for shifting, through the linkage system 272, the orifice assembly 243 forwardly and rearwardly with respect to, and in synchronism with rotation of, the toothed discs. Although use of motive power means of a variety of types, including pressure fluid cylinders, is contemplated, the disclosed embodiment employs an interlinked pair of solenoids indicated in broken lines at 281 and 282 in FIG. 13. The solenoid 281 is rearwardly actuable and the solenoid 282 is forwardly actuable. A link indicated in broken lines at 283 interconnects the armatures of the solenoids 281 and 282 and the armature 284 of solenoid 282 pivotally connects to the rearward end of the link 275.

Figure 19:
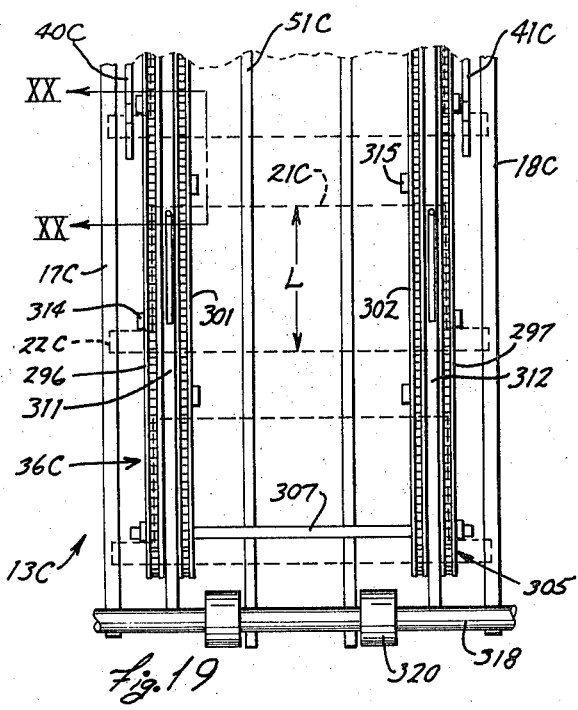
FIG. 19 is a fragmentary top elevational view of a portion of the output end of the apparatus of FIG. 12.

The solenoids 281 and 282 are actuated through conventional electrical conductors, schematically indicated by the broken line 286, from a switch 287 (FIG. 12) fixed on the side of the machine. The switch 287 is similarly connected to the corresponding actuating unit, not shown, on the other side of the machine, which serves disc 41C (FIG. 19). A shaft 291 rotatable in synchronism with the disc shaft 42C carries a switch actuator cam 292 for actuating switch 287 in a manner to cause the solenoids 281 and 282 to move the adjustable orifice assembly forwardly and rearwardly in synchronism with rotation of the disc 40C as hereinafter discussed.

The shaft 291, which may be the master drive shaft for various grid transferring components in the machine, e.g., the oscillating members, discs, and input and output section mechanism is connected through any convenient mechanical means generally indicated by broken line 290 (FIG. 12) to the shaft 42C supporting the discs. In the particular embodiment shown, wherein there are eight teeth 46C per disc, the shaft 42C turns at one eighth the speed of shaft 291 so that the cam 292 actuates and deactuates the switch 287 once as each succeeding tooth moves past the input portion 11C.

The modified output section 13C includes a modified output conveyor assembly 36C.

The conveyor assembly 36C includes a transversely spaced outer pair of endless conveyor chains 296 and 297 (FIG. 19) and an inner pair of endless conveyor chains 301 and 302, the chains of the inner and outer pairs being preferably symmetrically spaced on opposite sides of the center line of grid travel along the output section 13C. The chains 296, 297, 301 and 302 have upper and lower reaches, the upper reaches preferably being horizontal and extending forwardly from a point within the orbit of the teeth 46C of the discs, for movement forwardly away from the discs. Such conveyor chains are supported by forward and rearward sprocket sets 305 and 306 mounted on forward and rearward, transversely extending shafts 307 and 308. The shafts 307 and 308 are, in the particular embodiment shown, supported for rotation by upstanding, longitudinally extending walls 311 and 312, the wall 311 being located between chains 296 and 301 and the wall 312 being located between the chains 302 and 297, such walls being fixed by any convenient means not shown with respect to the frame structure of the machine. The discs 40C and 41C are respectively disposed between the machine sidewall 17C and outboard chain 296 and between the machine wall 18C and outboard chain 297.

Guide rods 51C extend from a position rearward of the disc axis forwardly along between and substantially in coplanar relation with the upper reaches of the chains 296, 297, 301 and 302.

The outboard chains 296, and 297 are provided with upstanding, transversely aligned lugs 314. The spacing of the lugs 314 along each such chain exceeds by a desired amount the length L (FIG. 19) of the grids 21C. The lugs 314 are adapted to abut the ears 22C of an adjacent grid 21C and move such grid forwardly with the advancing upper reaches of such chains.

Similarly, the inboard chains 301 and 302 are provided with upstanding, transversely aligned lugs 315 spaced longitudinally therealong. The lugs 315 are spaced inboard of the grid ears and are adapted to engage the rearward, trailing edge of a grid 21C to move same forwardly after such grid has reached the forward end of the chain conveyor and the ears 22C have been disengaged by the outboard lugs 314. The inboard lugs 315 are normally spaced behind the grid 21C and abuts same after the outboard lugs 314 have ceased to move the grid forwardly.

A suitable holddown unit 316 preferably overlies the path of the grids along the output section 13C to preclude any tendency for grids to jump out of engagement with the lugs 314.

In the particular embodiment shown in FIGS. 12 and 19, an additional output device is provided at the forward end of the output conveyor 36C and here comprises a vertically spaced pair of pinch roller shafts 318 and 319 supported for rotation by any convenient means not shown on the frame of the machine, for example on the walls 17C and 18C. Resilient pinch rollers 320 on the shafts 318 and 319 grip therebetween successive grids 21C moved off the conveyor 36C by the inboard lugs 315, as for stacking same, advancing same onto a further conveyor, not shown or moving same in any desired way toward a pasting station or the like.

One of the chain conveyor shafts 306 and 307 (and where pinch rollers are provided one of the pinch rollers shafts 318 and 319) is rotatably driven in synchronism with the discs 40C and 41C by any conventional positive drive means, schematically indicated in FIG. 12 by the broken lines 322 (and 323). Synchronism of drive is such that the conveyor chains and pinch rollers forward grids at the same rate that grids are presented thereto by the discs 40C and 41C.

Although the operation of the modified device 10C of FIGS. 12 through 22 has been indicated above, same will now be summarized to insure a clear understanding thereof.

In setting up the device 10C preparatory to a grid feeding operation, the width of the orifice 266 is first adjusted to be slightly greater than the thickness of the grid ears 22C to be received therein. Such is accomplished by loosening of screw 256 and adjustment of screw 268 to vary the relative angular orientation of arms 246 and 253 and thereby the spacing of orifice defining elements 264 and 265. The screw 256 is then tightened to rigidly fix the orifice width.

Adjustment of the screw 231 locates the mounting plate 221 and hence the rearward end of stop block 236 with respect to the adjacent orbit of the tip of the disc teeth 46C, the rearward end of stop block 236 preferably being located such that a grid ear 22C positioned thereagainst will be in the path of the tip portion of an advancing tooth 46C.

Adjustment of screw 251 determines the rear limiting position of the orifice 266 by limiting rearward pivotal movement of arm 256 on screw 247. As shown in FIG. 14, the orifice 266, when in its rear position, has its forward side in alignment with the rearward face of the stop block 236. The orifice 266 is thus substantially vertical and is aligned with the path which will be followed by the ear 22C of a grid as same is raised by the tooth 46C of the disc from the pivot member 56C.

Since similar apparatus is provided on each side of the device 10C for coacting in the same way with the two oppositely extending ears 22C of a given grid, the following discussion of operation will for convenience in reference deal only with one side of the machine, but will be understood to apply to both sides of the machine.

Given the adjustments discussed above, the device 10C is energized and a series of grids 21C are placed on the conveyor chains of the input section 11C. The ears 22C are carried forwardly by such chains, as discussed above with respect to the device 10, onto the upper edge of the oscillating members, e.g., member 56C and into abutting relation with the abutment edge 64C thereof to achieve the condition shown in FIG. 16. At this point, the adjacent orifice 266 is in its rearward position and a tooth 46C of the adjacent disc 40C is moving upwardly toward the level of stop block 236.

The oscillating member 56C then rocks forwardly, as described with respect to the device 10, to bring the ear 22C of the forwardmost grid into abutment with the stop block 236. The tip of the upwardly moving disc tooth 46C then picks up the ear 22C moving same upwardly along the rearward edge of orifice element 264, out of contact with the stop block 236 and then into gap 266, as indicated in FIG. 17.

After the ear 22C has cleared the stop block 236 and is positioned at least partially in the gap 266, the orifice 266 is shifted forwardly positively shifting the ear 22C from the tip of the tooth 46C to the root thereof and, more particularly, into the notch 213. The forward shifting of the orifice 266 is accomplished, in the particular embodiment shown, by rotation of the cam 292 out of contact with limit switch 287 (FIG. 12) which through suitable wiring 286 de-energizes normally energized solenoid 281 and energizes forward solenoid 282, thereby shifting linkage 272 forwardly and pivoting arms 246 and 253 forwardly, the forward motion of such arms carrying forwardly the gap 266.

A subsequent return of the cam 292 into contact with the switch 287 reverses energization of the solenoids 281 and 282 and returns the orifice 266 to its rearward position, in preparation for receiving the ear of the next grid.

It will be noted that, in the above sequence, the grid ear 22C is positively located, in the forward-rearward direction, from the time it contacts the stop block 236. More particularly, as the tooth tip lifts the forwardmost grid ear 22C from the oscillating member 56C, forward movement of such ear is prevented first by the rear face of stop block 236 and then by such face assisted by the rear face of orifice element 264. Rearward movement of such grid ear is prevented by the further grid ears disposed rearwardly thereof and then by such further grid ears and the forward face of orifice element 265. At that point, such ear 22C lies within the orifice 266.

Such ear looses contact with the stop block and following grid ears only after it is positively between the orifice elements 264 and 265. Thus, the grid ear 22C is positively located on the tip of the tooth until the orifice 266 is shifted forwardly to position grid ear 22C within notch 213, as in FIG. 18. Thus, the grid ear cannot drop off the tip of the tooth. On the other hand, proper positioning of the stop block 236 positively precludes that more than one grid will be picked up by an upwardly advancing tooth 46C.

The above sequence is repeated as succeeding teeth 46C move past the input portion 11C of the machine.

Figure 20:
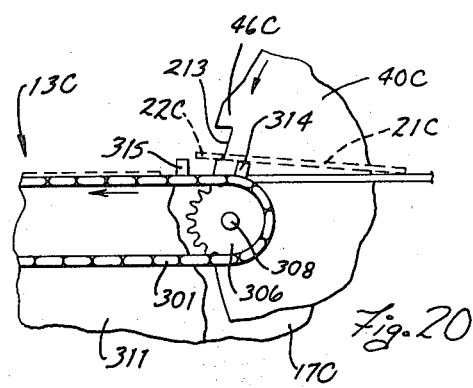
FIGS. 20 through 22 are fragmentary sectional views substantially taken on line XX—XX in FIG. 19 and showing a sequence of operative steps.

As the disc 40C continues to rotate, the grid 21C above described moves upwardly out of the orifice 266 and is carried upwardly, forwardly and downwardly toward the output portion 13C, the sequence of positions thus assumed by the grid being indicated in broken lines in FIG. 12. It will be noted that during the course of such movement the trailing or bottom edge of the grid 21C engages the guide rods 51C and slides forwardly therealong, the grid thus shifting from a substantially vertical position to a substantially horizontal position as it is moved forwardly. At some point during this movement, the ear 22C of the grid will slide forwardly and downwardly along the notch 213 in response to the force of gravity until it lies against the end of the notch remote from the tooth 46C and it is in such condition that the grid 21C approaches the chain conveyors of the output section 13C, as shown in FIG. 20.

Figure 21:
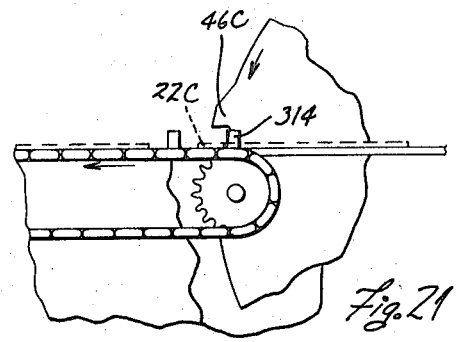
Figure 22:
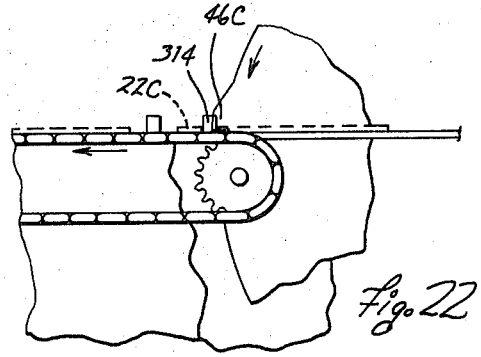

Due to the synchronism in the rotational drive of the pickup discs 40C and 41C and the output conveyor chains 296, 297, 311 and 312, the grid ears 22C approach the top of the output chain conveyors just to the rear of one set of inboard lugs 315 and just forward of another pair of output lugs 314. As seen in FIG. 21, the forwardly moving lug 314 engages the adjacent ear 22C just as, or immediately before, such ear is deposited on the upper reach of the chains. The lug 314 then moves the grid ear 22C forwardly out of the notch 213 and then out from under the downwardly advancing tooth 46C, as seen in FIG. 22, so as to avoid any possibility of the grid ear being contacted or damaged by the downwardly advancing tooth 46C.

At the same time it will be noted that the grid ear 22C as it is advanced downwardly toward the output conveyors is positively restrained against sliding downwardly along the periphery of the disc 40C and away from the tooth 46C in an uncontrolled or random manner by contact with the leading edge of the notch 213. Thus, the time in which the grid 21C drops upon the output conveyor is a fixed and predetermined point in the rotation of the disc 40C, as is the point in time at which the lug 314 moves the grid forwardly along the output portion 13C of the apparatus. In this manner, the spacing of grids 21C, as they move along the output section 13C, is positively fixed and random variations in spacing of the grids are precluded.

As a given grid 21C is moved along the output conveyors toward the pinch rollers 320, the lugs 314 engaging the ears 22C eventually move forwardly past the shaft 307 and then downwardly about the radius of the sprockets 305. Thus, the grid is no longer driven forwardly by the outboard lugs 314. However, at a fixed, short time thereafter, the inboard lugs 315 move forwardly into engagement with the rear or trailing edge of the forwardmost grid and impel same into the pinch rollers 320. Although the device 10 of FIG. 1 has been found to work satisfactorily over a wide range of normal operating speeds, the modified device 10C was particularly developed not only to provide for more positive location of a grid as it is cycled through the sections 11C, 12C and 13C but also to provide reliable grid pickup by the discs at very high operating speeds. Reliable operation at such high operating speeds is assisted by positive location of each successive grid on the pickup discs through use of the movable orifice and by the reduced speed of the discs allowed by the increase in the number of teeth thereon. The latter reduces accelerative and decelerative loading on the grid ears as they are shifted between the portions 11C, 12C and 13C and reduces the possibility of grid damage.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positively and reliably receive said articles at an inboard portion thereof;
wherein the input conveyor means comprises an endless input conveyor having a substantially horizontal upper reach for supporting a plurality of articles and means for moving the upper reach at the first speed direction, the pickup means comprises a shaft for rotatably supporting a disc, the shaft being vertically located adjacent the plane of the upper reach of the input conveyor, the orbit of teeth on said disc being located near the forward end of the upper conveyor reach, an oscillating member and said disc being disposed in parallel but spaced planes, the oscillating member and input conveyor means defining parallel but spaced planes, the oscillating member further including means engageable therewith for oscillating the oscillating member between the first and second limiting positions.

2. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positively and reliably receive said articles at an inboard portion thereof;
an output conveyor, the output conveyor being located on the opposite side of the pickup means from the input conveyor means and guide means, the pickup means comprising a peripherally toothed rotating disc adapting to remove an article from the oscillating means and place same on the output conveyor, the output conveyor being of the endless type and having a plurality of upstanding lugs thereon for engaging articles delivered thereto by the disc and moving same away from the disc.

3. A device as defined in claim 2 including means for synchronizing forward movement of the lugs on the output conveyor with rotation of the disc teeth in such manner that as an article is being deposited on the output conveyor it is engaged by a lug thereof and moved out of the path of the advancing tooth of the disc which previously supported the article on the disc.

4. A device as defined in claim 3 wherein each tooth on the disc has its leading edge in part defined by a notch in the periphery of the disc, the portion of the articles engaged by the disc being laterally extending ears, such ears lying in the trailing end of the notch and against the leading edge of the tooth as the article is moved from the oscillating means and shifting along the notch to rest upon the leading edge thereof as the article nears the output conveyor, the article ear being positively prevented from advancing along the periphery of the disc by the leading edge of the notch until deposited on the output conveyor and engaged by a lug thereof so as to maintain a constant and preselected spacing between articles on the output conveyor.

5. A device as defined in claim 3 wherein the output conveyor comprises first and second endless conveyors each having upstanding lugs fixed thereto, the lug on the first conveyor leading a lug on the second conveyor by a distance exceeding the forward-rearward spacing of portions of the article engageable by the first conveyor lug and second conveyor lug, the first conveyor lug moving an article away from the pickup means in a forward direction and disengaging the article at the forward end of the first conveyor, the second conveyor lug engaging the article there-after and shifting the article off the output conveyor means, output means being provided for receiving the article from the output conveyor.

6. A device as defined in claim 5 including a guide element adapted for supporting and trailing the edge of the article in the main portion of its travel on the pickup means and as it is deposited on the output conveyor and further including holddown means above the output conveyor for preventing movement of the articles off therefrom.

7. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positively and reliably receive said articles at an inboard portion thereof, the guide means including an orifice member engageable with said articles and actuating means for shifting the orifice member toward said path to firmly locate said articles on said inboard portion of said pickup means, in which the pickup means includes a tooth upon which said article can be supported for movement along said path, said tooth being movable along said path, and means limiting the travel of said orifice member for causing said orifice member to positively locate said article at the root of said tooth and inboard of the tooth tip.

8. A device as defined in claim 7 in which the pickup means includes teeth and the actuating means includes plural means for moving the orifice member back and forth in synchronism with presentation of successive teeth of the pickup means moving along said path therepast.

9. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positivley and reliably receive said articles at an inboard portion thereof, the guide means including an orifice member engageable with said articles and actuating means for shifting the orifice member toward said path to firmly locate said articles on said inboard portion of said pickup means, said orifice member comprising means defining a slot into which an article is moved, said means defining said slot being spaced to positively prevent more than a selected number of articles at a time from being moved into such slot.

10. A device as defined in claim 9 in which said pickup means comprises a rotatable disc and a tooth fixed on the periphery of said disc, said slot being substantially tangential to the path described by said tooth as said disc rotates and being movable with said orifice member into one limiting position in the path of the root of said tooth and being movable to a further limiting position substantially remote from said disc, whereby rotation of said disc and tooth past said orifice member enables the latter to position an article located in said slot at said root of said tooth, continued rotation of said disc causing said tooth to carry said article out of said slot and away from the orifice member and input conveyor means.

11. A device as defined in claim 9 in which said slot is sized to receive only one article at a time and including means for lifting said article into said slot.

12. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positively and reliably receive said articles at an inboard portion thereof;
oscillating means for shifting articles from the input conveyor means into adjacency with said guide means.

13. A device as defined in claim 12 wherein the pickup means comprises a tooth on the periphery of a rotatable disc, and including means supporting the disc for rotation in fixed location for causing the tooth to follow a circular orbit past a limiting position of the oscillating means, the means for moving the oscillating member comprising a rotatable shaft having an eccentric and means on the oscillating member for engaging the eccentric whereby rotation of the eccentric causes pivotal oscillation of the oscillating member, and including means synchronizing the rotation of the disc and the eccentric in a manner that the disc rotates one tooth past the input means per oscillations of the oscillating member.

14. A device as defined in claim 12 wherein the pickup means comprises a rotatable disc having a radially outwardly extending tooth on the periphery thereof and a notch in the periphery at the leading edge of the tooth, whereby articles may be picked up from the oscillating means by the tip of the tooth and thereafter shifted along the leading edge of the tooth into the notch for preventing accidental dislodgement of the article from the tooth while causing the tooth to pick up only one article at a time from the oscillating means.

15. A device as defined in claim 12 in which said guide means disposed adjacent the pickup means and the oscillating means for assisting the pickup means in removing an article from the oscillating means, the guide means including an orifice for receiving a portion of the article as such article leaves the oscillating means, the article being removed from the oscillating means by the tip of a tooth on the pickup means, the orifice comprising a slot substantially alignable with the path of the tooth tip, mounting means allowing movement of the orifice toward the pickup means for urging an article in the orifice along the leading edge of the tooth away from the tip thereof and toward the root thereof to insure secure carrying of the article by the pickup means and motor means for shifting the orifice toward and away from the pickup means in synchronism with engagement of successively presented teeth of the pickup means with successive articles on the oscillating means.

16. A device as defined in claim 15, wherein the orifice is defined by a pair of spaced elements supported for forward rearward reciprocation along the line of travel of articles on the input conveyor means and above the path of the oscillating means and adjacent the rearward edge of the pickup means, the pickup means comprising a peripherally toothed disc, a tooth of the disc having its leading edge at least partially defined by a notch in the disc sized for receiving a portion of the article, the spaced orifice defining elements being shiftable between rearward and forward positions, the rearward position corresponding to the path of the article as it is moved by the tip of the tooth off the oscillating means, the forward position corresponding to the location of the article when seated in the notch, means for moving the orifice defining elements in synchronism of rotation of the disc so that the orifice is located in the rearward position for receiving the article and after the article is located within the orifice shifting to the forward position for seating the article firmly in the notch.

17. A device as defined in claim 16 including means supporting the orifice defining elements and a stop block carried by such means, the stop block being located forwardly of the path of the tip of the tooth by a distance corresponding to the thickness of the article for preventing forward movement of the article therebeyond prior to engagement thereof by the tip of the tooth on the disc, the forward one of the orifice defining elements being located closely adjacent and above the stop block, the forward edge of the orifice being located in alignment with the rearward face of the stop block when the orifice is in its rear position, the orifice shifting to its forward position only after the article has been moved upwardly past the stop block by the tooth.

18. A device as defined in claim 12 wherein the guide means includes a mounting plate positioned adjacent the input conveyor means and oscillating means and arranged for adjustment along the path of articles moving on the input conveyor means, a first upstanding arm pivoted on the mounting plate for movement toward and away from the pickup means, a second upstanding arm adjustably pivoted on the first arm to enable variation of the angle between the first and second arms, means for limiting rearward movement of the first arm away from the pickup means, first and second substantially L-shaped orifice members respectively carried by the first and second pivot arms and extending transversely therefrom and toward the path of teeth on the movable pickup means, the free ends of the L-shaped members defining substantially coplanar elements spaced for defining an orifice, a linkage system connected to one of the arms, the arms being pivotally oscillated in synchronism with movement of teeth on the pickup means toward the orifice in such manner that the orifice is in a rearward position as such a tooth raises an article upwardly thereinto and thereafter is shifted to a forward position for urging the article inwardly along the tooth toward the root thereof.

19. A device as defined in claim 12 in which said input conveyor means, pickup means, and guide means each comprise a laterally spaced pair of members, said oscillating means including a laterally spaced pair of oscillating members, the spacing of the members of each pair being less than the width of the articles so that each article is suspended between successive pairs in a selected sequence.

20. A device as defined in claim 12 in which said oscillating means includes a lifting surface which lifts at least one leading article away from the stack on said input conveyor means.

21. A device as defined in claim 20 in which said pickup means includes a tooth movable along said path for lifting an article from said lifting surface of said oscillating means and transferring said article toward an output mechanism while tilting said article, said guide means including an orifice member for moving the article to a location at the root of said tooth and away from the tip thereof, movement of said tooth along said path lifting said article through and away from said orifice member.

22. A device as defined in claim 20 in which said lifting surface has a first limiting position substantially level with said input conveyor means and enabling said input conveyor means to slide at least one article onto said grid lifting surface and including means for shifting said oscillating means so that said lifting surface locates in a second limiting position adjacent said guide means and inaccesible from the input conveyor means for locating said leading article adjacent said guide means while separating same from said stack.

23. A device as defined in claim 22 in which said second limiting position of said lifting surface locates said leading article in the path of the tip of said tooth of said pickup means whereby the tooth tip tends to pick up only the leading article from said lifting surface, in which said guide means in one position of movement lies in the path of said tooth tip and includes a slot aligned with said tooth tip path whereby the leading article is carried by the tooth tip from said lifting surface and into said slot, said guide means including means defining said slot and positively interfering with movement of articles other than said leading article of said lifting surface and into said slot.

24. A device as defined in claim 11 in which said articles are substantially platelike battery elements.

25. A device as defined in claim 12 wherein the oscillating means has a support leg, a drive leg and pivot means for pivotally supporting said oscillating means, said drive leg extending substantially horizontally and said support leg extending substantially vertically, an article support edge atop said support leg and substantially paralleling said drive leg, and including a stop adjacent the support surface and facing articles on such support edge, said oscillating means being movable past said stop, said stop being engageable by articles on said support edge, said pickup means comprising a movable member having a tooth movable substantially upwardly past said stop and oscillating means, said tooth having a leading edge which partially overlaps said stop by less than half the thickness of one of said articles, said guide means being disposed above said support edge and having first and second slot defining members adapted for receiving therebetween an article raised by said tooth from said support edge and including means for causing said slot defining members to shift an article along the leading edge of the tooth away from the free tooth end and into firmly supported engagement with the perimeter of the movable member.

26. A device for feeding articles, comprising:
input conveyor means for feeding articles in stacked relation;
pickup means movable in a path past the input conveyor means for moving articles away from the stack;
guide means near said input conveyor means for selectively receiving articles of said stack and movable across said path for causing said pickup means to positively and reliably receive said articles at an inboard portion thereof;
fixed stop means near said pickup means for positively stopping advancing movement of articles toward said path at a point at least near said path, said guide means having a first limiting position in alignment with said fixed stop means to enable articles to be shifted from abutment with said fixed stop means into engagement with said guide means.

27. A device as defined in claim 26 in which said guide means has a second limiting position in alignment with said path, said pickup means including a tooth of length exceeding the thickness of the article, said guide means including actuating means for causing same to shift an article from a location adjacent the path of the tip of said tooth to a location on the path on the root of said tooth, so as to insure reliable engagement of the article by the pickup means and thereby transferring of the article by the tooth.

* * * * *

UNITED STATES PATENT OFFICE
CERTIFICATE OF CORRECTION

Patent No. 3,799,322　　　　　　　　Dated　March 26, 1974

Inventor(s) Ronald C. Van Linder and Basil R. Van Linder

It is certified that error appears in the above-identified patent and that said Letters Patent are hereby corrected as shown below:

Col. 24, line 38; change "the" (second occurrence) to ---a---.

line 39; change "speed" to ---speed and---.

line 50; delete "the".

line 68; change "adapting" to ---adapted---.

Col. 26, line 66; change "the means" to ---including means---.

line 67; change "member" to ---means---.

Col. 27, line 1; change "member" to ---means---.

line 3; change "member" to ---means---.

line 6; change "oscillations" to ---oscillation---.

line 7; change "member" to ---means---.

line 19; after "means" (first occurrence) insert ---is---.

line 52; after "notch," insert ---said motor means including---.

line 53; change "of" (first occurrence) to ---with---.

UNITED STATES PATENT OFFICE
CERTIFICATE OF CORRECTION

Patent No. 3,799,322          Dated March 26, 1974

Inventor(s) Ronald C. Van Linder and Basil R. Van Linder

It is certified that error appears in the above-identified patent and that said Letters Patent are hereby corrected as shown below:

Col. 28, line 56; delete "grid".

line 62; after "in which" insert ---said pickup means includes a tooth movable on said path and having a tip and in which---.

Col. 29, line 6; change "of" (second occurrence) to ---off---.

line 8; change "Claim 11" to ---Claim 12---.

line 17; change "surface" to ---edge---.

Signed and sealed this 15th day of October 1974.

(SEAL)
Attest:

McCOY M. GIBSON JR.
Attesting Officer

C. MARSHALL DANN
Commissioner of Patents